(12) United States Patent
Shimizu et al.

(10) Patent No.: US 9,217,888 B2
(45) Date of Patent: Dec. 22, 2015

(54) DISPLAY DEVICE

(71) Applicant: Sharp Kabushiki Kaisha, Osaka (JP)

(72) Inventors: Yukio Shimizu, Osaka (JP); Seiji Muraoka, Osaka (JP); Motoji Shiota, Osaka (JP); Takeshi Horiguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/396,138

(22) PCT Filed: Apr. 19, 2013

(86) PCT No.: PCT/JP2013/061579
§ 371 (c)(1),
(2) Date: Oct. 22, 2014

(87) PCT Pub. No.: WO2013/161685
PCT Pub. Date: Oct. 31, 2013

(65) Prior Publication Data
US 2015/0109550 A1    Apr. 23, 2015

(30) Foreign Application Priority Data

Apr. 27, 2012  (JP) ................................. 2012-102868

(51) Int. Cl.
G02F 1/1333    (2006.01)
G02F 1/133     (2006.01)
G02F 1/1345    (2006.01)
G02F 1/1335    (2006.01)

(52) U.S. Cl.
CPC ........ *G02F 1/13306* (2013.01); *G02F 1/13452* (2013.01); *G02F 1/133345* (2013.01); *G02F 1/133602* (2013.01)

(58) Field of Classification Search
CPC    G02F 1/13452; G02F 1/1345; G02F 1/13454
See application file for complete search history.

(56) References Cited

U.S. PATENT DOCUMENTS

| 7,956,976 B1 * | 6/2011 | Hayata et al. ........... G09F 3/006 |
| 2002/0018169 A1 | 2/2002 | Kato |
| 2002/0109814 A1 | 8/2002 | Murahashi et al. |
| 2005/0092993 A1 | 5/2005 | Aruga |

FOREIGN PATENT DOCUMENTS

| JP | 7-263485 A | 10/1995 |
| JP | 11-305681 A | 11/1999 |
| JP | 2001-215892 A | 8/2001 |
| JP | 2002-244580 A | 8/2002 |
| JP | 2005-99302 A | 4/2005 |
| JP | 2006-317517 A | 11/2006 |

\* cited by examiner

*Primary Examiner* — Phu Vu
(74) *Attorney, Agent, or Firm* — Chen Yoshimura LLP

(57) ABSTRACT

A liquid crystal display device includes: a liquid crystal panel having a display area and non-display area; a flexible substrate in the non-display area and connected to a control circuit substrate; a plurality of drivers in the non-display area; a plurality of connection wiring lines in the non-display area for connecting the flexible substrate to the plurality of drivers; a first driver; a second driver that is arranged further away from the flexible substrate than the first driver; a non-overlapping connection wiring line that connects the second driver to the flexible substrate and that does not overlap the first driver; and an overlapping connection wiring line that connects the second driver to the flexible substrate and that has a least a portion thereof overlapping the first driver.

15 Claims, 19 Drawing Sheets

DISPLAY DEVICE

TECHNICAL FIELD

The present invention relates to a display device.

BACKGROUND ART

Display devices having a display panel such as a liquid crystal display panel are used in portable information terminal devices such as mobile phones, smart phones, and tablet personal computers, and in electronic devices such as computers. These types of display devices each have a display panel that has a display unit for performing display, and a driver that has an LSI for driving the display panel by supplying output signals to the display unit that have been generated by processing input signals from a signal supply source. In display devices that are categorized as small-to-medium size, such as those above, it is preferable that the method of mounting the driver involve COG (chip on glass) mounting technology for directly mounting the driver on the non-display region of the display panel. One known example of this type of display device is disclosed in Patent Document 1 below.

RELATED ART DOCUMENT

Patent Document

Patent Document 1: Japanese Patent Application Laid-Open Publication No. 2001-215892

Problems to be Solved by the Invention

In a display device such as the type described above, a flexible substrate has one end thereof connected to an external signal supply source and another end connected to the non-display region of the display panel. Signals from the external signal supply source transmitted by the flexible substrate are supplied to drivers via connection wiring lines arranged on the non-display region of the display panel.

A plurality of the drivers are sometimes used depending on the screen size and definition (resolution) of the display panel, but in such a case, problems may occur when ensuring space for the connection wiring lines. In other words, if there are constraints on the size, placement, and the like on the portion of the flexible substrate that attaches to the display panel, then deviations may occur between the plurality of drivers and the flexible substrate. Connection wiring lines for connecting the drivers and the flexible substrate that are relatively far from each other require a long wiring length, and the wiring resistance becomes greater than if the drivers and flexible substrate were relatively close to each other; therefore, it is preferable that the wiring lines be made relatively wide. If the wiring lines are made relatively wide, however, the space needed for these wiring lines on the non-display region increases, and thus the non-display region needs to be expanded, the other shape of the display device becomes larger, the frame region becomes wider, and the like.

SUMMARY OF THE INVENTION

The present invention was completed in view of the above-mentioned situation, and aims at keeping the non-display region small.

Means for Solving the Problems

A display device of the present invention includes: a display panel having a display area that can display an image and a non-display area outside of this display area; an external connection member attached to the non-display area of the display panel for connecting to an external signal supply source; a plurality of connection wiring lines disposed in the non-display area of the display panel; and a plurality of driver circuit sections attached to the non-display area of the display panel and connected to the external connection member by the connection wiring lines, the driver circuit sections receiving input signals from the external signal supply source via the external connection member and transmitting an output signal to the display panel, thereby driving the display panel; wherein the plurality of driver circuit sections include a first driver circuit section and a second driver circuit section that is disposed further towards a side of the non-display area opposite to the external connection member than the first driver circuit section, and wherein the plurality of connection wiring lines include a non-overlapping connection wiring line and an overlapping connection wiring line, the non-overlapping connection wiring line connecting the second driver circuit section to the external connection member and being disposed so as not to overlap the first driver circuit section, and the overlapping connection wiring line connecting the second driver circuit section to the external connection member and having at least a portion thereof overlapping the first driver circuit section.

With this configuration, input signals from the external signal supply source are supplied to the plurality of driver circuit sections via the external connection member and the plurality of connection wiring lines. The plurality of driver circuit sections process the supplied input signals and generate output signals and these output signals are outputted to the display area, thereby making it possible to drive the display panel. In terms of equalizing the wiring resistance of the plurality of connection wiring lines, it is preferable that the connection wiring lines connecting the external connection member to the second driver circuit section, which is relatively far from the external connection member, have a larger line width, but this risks widening the arrangement space needed for the connection wiring lines in the non-display area. In this regard, the plurality of connection wiring lines include the overlapping connection wiring line that connects the external connection member to the second driver circuit section relatively far therefrom and that has at least a portion thereof overlapping the first circuit section, which is relatively close to the external connection member; therefore, the amount that the overlapping connection wiring line overlaps the first driver circuit section can be secured as favorable arrangement space for the non-overlapping connection wiring line, which connects the second driver circuit section to the external connection member in the non-display area and which does not overlap the first driver circuit section. Accordingly, it is possible to equalize the wiring resistance of the connection wiring lines that connect the first driver circuit section to the external connection member and of the connection wiring lines that connect the second driver circuit section to the external connection member, while keeping the non-display area small. Since the non-display area is kept small, this configuration is suitable for decreasing the outer shape of the display device, narrowing the frame region, and the like.

The following configurations are preferable as respective aspects of the present invention.

(1) In the above-mentioned configuration, the plurality of connection wiring lines further include: first connection wiring lines that connect the first driver circuit section to the external connection member; and second connection wiring lines that connect the second driver circuit section to the external connection member, wherein the second connection wiring lines include the overlapping connection wiring line and the non-overlapping connection wiring line, and wherein the second connection wiring lines have a greater line width than the first connection wiring lines. With this configuration, it is possible to equalize the wiring resistance of the first connection wiring lines having a relatively short wiring length and the second connection wiring lines having a relatively long wiring length. This makes the input signals supplied to the first driver circuit section and the second driver circuit section via the first connection wiring lines and the second connection wiring lines less susceptible to rounding and the like. This can also suppress the costs required for providing the first connection wiring lines and the second connection wiring lines as compared to if the equalization of wiring resistance was attempted by differing the thickness and materials of the first connection wiring lines and second connection wiring lines.

(2) The above-mentioned configuration, wherein the external connection member connects to an edge of the display panel, and wherein the plurality of driver circuit sections are arranged in a row with gaps therebetween along the edge of the display panel closer to the display area than the external connection member. With this configuration, the plurality of driver circuit sections are arranged in a row with gaps therebetween along the edge of the display panel, or namely, the direction in which the external connection member extends; thus, the second driver circuit section is disposed further away from the external connection member than the first driver circuit section. Even with this configuration, due to the connection wiring lines having the overlapping connection wiring line as described above, the amount that the overlapping connection wiring line overlaps the first driver circuit section can be secured as favorable arrangement space for the non-overlapping connection wiring line that connects the second driver circuit section to the external connection member n the non-display area, thereby making it possible to keep the non-display area small.

(3) In the above-mentioned configuration, the first driver circuit section is provided at a position that overlaps a position of the external connection member in a direction along the edge of the display panel, and wherein the second driver circuit section is provided at a position that does not overlap the position of the external connection member in the direction along the edge of the display panel. With this configuration, the connection wiring lines connecting the second driving circuit section to the external connection member have a more complicated wiring structure than the connection wiring lines connecting the first driving circuit section to the external connection member, and thus, it is more difficult to secure arrangement space for the connection wiring lines connecting the second driver circuit section to the external connection member. In this regard, due to the connection wiring lines having the overlapping connection wiring line as described above, the amount that the overlapping connection wiring line overlaps the first driver circuit section can be secured as favorable arrangement space for the non-overlapping connection wiring line that connects the second driver circuit section to the external connection member in the non-display area, thereby making it possible to keep the non-display area small.

(4) In the above-mentioned configuration, the first driver circuit section is disposed near a center of the edge of the display panel, wherein the second driver circuit section is disposed near an end on the edge of the display panel, and wherein the external connection member is disposed in the center of the edge of the display panel. With this configuration, among the plurality of driver circuit sections, the one that is disposed near the end on the edge of the display panel is the second driver circuit section, which is connected to the external connection member by the overlapping connection wiring line, thereby allowing for the external connection member to be attached to the center of the edge of the display panel.

(5) In the above-mentioned configuration, the first driver circuit section is provided in a pair, the pair being arranged in a row near the center on the edge of the display panel, and wherein the second driver circuit section is provided in a pair, the pair being arranged near respective ends on the edge of the display panel. With this configuration, even if at least four of the driver circuit sections are arranged in a row, the pair of second driver circuit sections arranged near the ends are respectively connected to the external connection member by the overlapping connection wiring line, thereby making it possible to secure favorable arrangement space for the non-overlapping connection wiring line that respectively connects the pair of second driver circuit sections to the external connection member, which allows for the non-display area to be kept small.

(6) The above-mentioned configuration, further including: an insulating layer formed on the overlapping connection wiring line, the insulating layer being stacked on a side of the first driver circuit section that is being overlapped by the overlapping connection wiring line. With this configuration, it is possible to prevent the overlapping connection wiring line accidentally connecting to the first driver circuit section with the insulating layer.

(7) The above-mentioned configuration, wherein the plurality of driver circuit sections further include a third driver circuit section that is disposed further towards a side of the non-display area opposite to the external connection member than the second driver circuit section, wherein the plurality of connection wiring lines further include a second non-overlapping connection wiring line that connects the third driver circuit section to the external connection member, the second non-overlapping connection wiring line being disposed so as not to overlap the first driver circuit section and the second driver circuit section, and wherein the plurality of connection wiring lines further include a second overlapping connection wiring line that connects the third driver circuit section to the external connection member, the second overlapping connection wiring line having at least a portion thereof overlapping the first driver circuit section and the second driver circuit section. With this configuration, the overlapping connection wiring line that overlaps the first driver circuit section is included as one of the connection wiring lines that connects the second driver circuit section to the external connection member, and the second overlapping connection wiring line that overlaps the first driver circuit section and the second driver circuit section is included as one of the connection wiring lines that connects the third driver circuit section to the external connection member; therefore, it is possible to secure favorable arrangement space for the non-overlapping connection wiring line that connects the second driver circuit section to the external connection member and for the second non-overlapping connection wiring line that connects the third driver circuit section to the external connection member. Accordingly, it is possible to equalize the wiring resistance of the of the connection wiring lines that connect the first driver circuit section to the external connection member, the connection wiring lines that connect the second driver circuit section to the external connection member, and the connection wiring lines that connect the third driver circuit section to the external connection member, while keeping the non-display area small.

(8) The above-mentioned configuration, further including: input terminals disposed in the non-display area of the display panel; circuit input terminals respectively disposed in the first driver circuit section, the circuit input terminals respectively connecting to the input terminals; dummy terminals disposed in the non-display area of the display panel, the dummy terminals connecting to a portion of the overlapping connection wiring line overlapping the first driver circuit section; and circuit dummy terminals disposed in the first driver circuit section, the circuit dummy terminals not connecting to the circuit processing section. With this configuration, the input terminals on the display panel side connect to the circuit input terminals on the first driver circuit section side, and the dummy terminals connected to the overlapping connection wiring line on the display panel side connect to the circuit dummy terminals on the first driver circuit section side, thereby making it possible to stabilize the connection state of the input terminals and the circuit input terminals. The overlapping connection wiring line connects to the circuit dummy terminals but not to the processing circuit section; therefore, it is possible to prevent the input signals supplied to the overlapping connection wiring line from being accidentally processed in the first driver circuit section.

(9) The above-mentioned configuration, further including: a plurality of first input terminals disposed in the non-display area of the display panel, the first input terminals connecting to the first driver circuit section; and a plurality of first output terminals disposed closer to the display area than the first input terminals, the first output terminals connecting to the first driver circuit section, wherein the overlapping connection wiring line passes through at least one of between the respective plurality of first input terminals and between the respective first input terminals and the first output terminals to connect to the second driver circuit section. With this configuration, the overlapping connection wiring line that overlaps the first driver circuit section passes through at least one of between the respective plurality of first input terminals and between one of the first input terminals and one of the first output terminals to connect to the second driver circuit section and does not pass between the plurality of first output terminals; thus, it is not necessary to provide the structure that would be required for preventing the overlapping connection wiring line from short-circuiting with the first output terminals if the overlapping connection wiring line passed between the plurality of first output terminals. This makes it possible to suppress manufacturing costs of the display panel.

(10) The above-mentioned configuration, further including: a plurality of second input terminals disposed in the non-display area of the display panel, the second input terminals connecting to the second driver circuit section; and a plurality of second output terminals disposed closer to the display area than the second input terminals, the second output terminals connecting to the second driver circuit section, wherein the overlapping connection wiring line passes between the respective plurality of first input terminals, between the respective first input terminals and the first output terminals, and between the respective second input terminals and the second output terminals to connect to the respective second input terminals. With this configuration, the amount that the overlapping connection wiring line is not disposed on the side of the second input terminal opposite to the second output terminal can be secured as favorable arrangement space, as compared to if the overlapping connection wiring line were to connect to the second input terminal from the side opposite to the second output terminal. This makes it possible to ensure a favorable arrangement space for the non-overlapping connection wiring line, thereby allowing for the non-display area to be kept small.

(11) The above-mentioned configuration, wherein the overlapping connection wiring line passes between the respective first input terminals and the output terminals twice to connect to the second driver circuit section. This configuration is suitable for when it is difficult to secure space for passing the overlapping connection wiring line between the plurality of first input terminals.

(12) The above-mentioned configuration, wherein the overlapping connection wiring line passes between the respective plurality of first input terminals twice to connect to the second driver circuit section. This configuration is suitable for when it is difficult to secure space for passing the overlapping connection wiring line between the first input terminals and the first output terminals.

(13) The above-mentioned configuration, wherein the display panel is a liquid crystal panel constituted of a liquid crystal layer sealed between a pair of substrates. This type of display device as a liquid crystal display device can be applied to various uses and various types of electronic devices, such as portable information terminals, mobile phones, notebook computers, and portable gaming systems, for example.

(14) The above-mentioned configuration, further including: an illumination device disposed on a side of the display device opposite to the display side so as to face the liquid crystal panel, the illumination device capable of supplying light to the liquid crystal panel. With this configuration, light supplied from the illumination device can be used to display images on the display area of the liquid crystal panel.

EFFECTS OF THE INVENTION

According to the present invention, the non-display region can be kept small.

DETAILED DESCRIPTION OF EMBODIMENTS

<Embodiment1>

Embodiment 1 of the present invention will be described with reference to FIGS. 1 to 9. In the present embodiment, a liquid crystal display device 10 will be described as an example. The drawings indicate an X axis, a Y axis, and a Z axis in a portion of the drawings, and each of the axes indicates the same direction for the respective drawings. The up and down direction is based on that of FIG. 2 and the like, and the upper side thereof is the front side while the lower side thereof is the rear side.

Figure 1:
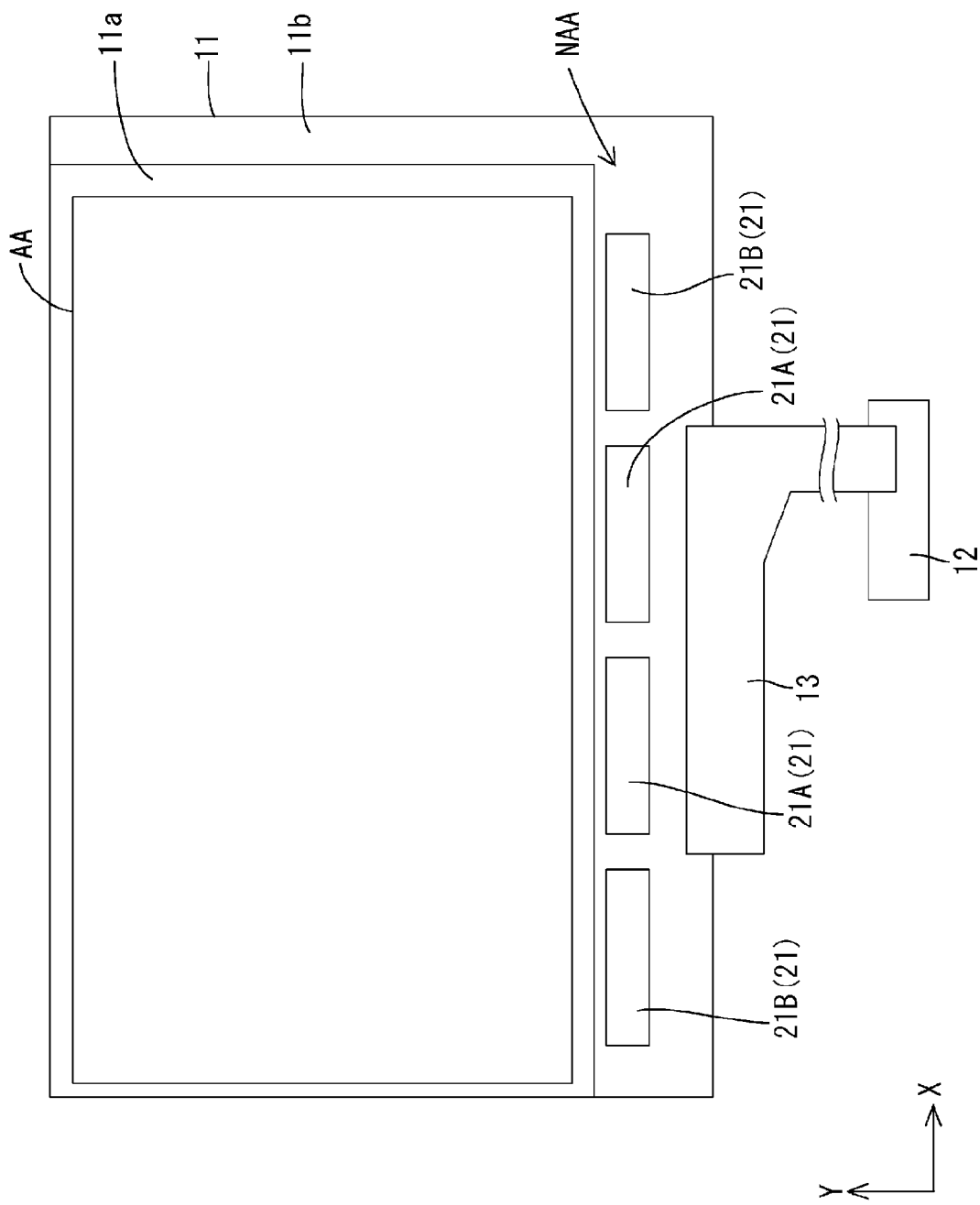
FIG. 1 is a schematic plan view of a connection configuration of a liquid crystal panel having drivers mounted thereon and a flexible substrate and control circuit substrate according to Embodiment 1 of the present invention.
Figure 2:
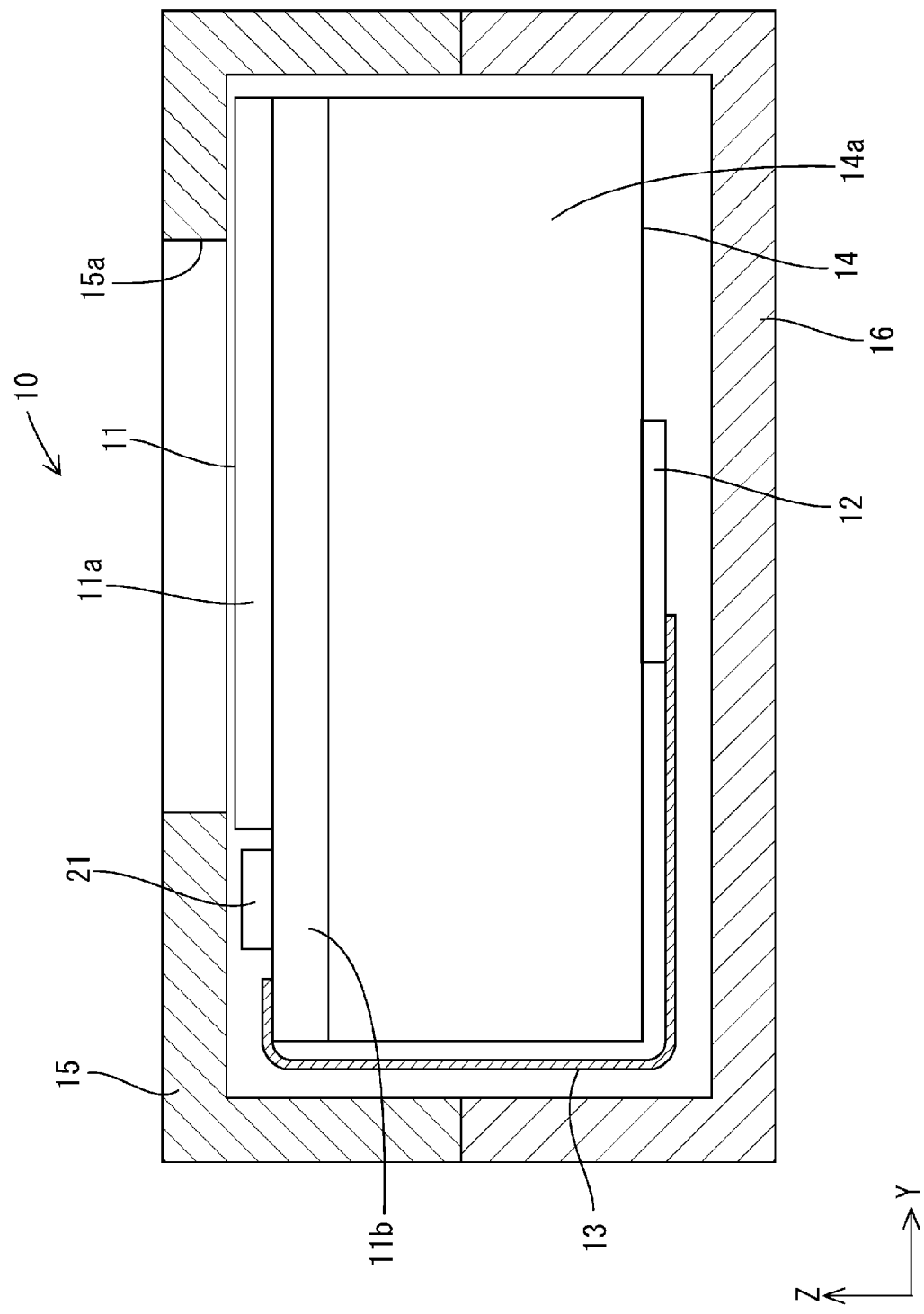
FIG. 2 is a cross-sectional view that shows a cross-sectional configuration of a liquid crystal display device along the longer side direction.

As shown in FIGS. 1 and 2, the liquid crystal display device 10 includes: a liquid crystal panel (display panel/display element) 11 that has a display area AA capable of displaying images and a non-display area NAA outside of the display area AA; drivers (driver circuit sections) 21 that drive the liquid crystal panel 11; a control circuit substrate (external power source/external signal supply source) 12 that externally supplies driving power, a reference potential, and input signals for images to the drivers 21; a flexible substrate (external connection component) 13 that electrically connects the liquid crystal panel 11 to the external circuit control circuit substrate 12; and a backlight device (illumination device) 14 that is an external light source for providing light to the liquid crystal panel 11. The liquid crystal display device 10 also includes front and back exterior members 15 and 16 for housing and holding the liquid crystal panel 11 and the backlight device 14 that are attached to each other. The front exterior member 15 has an opening 15a for exposing the display area AA of the liquid crystal panel 11 to the outside. The liquid crystal display device 10 according to the present embodiment can be used in various electronic devices such as portable information devices (including electronic books and PDAs), mobile telephones (including smartphones), laptops (including tablet PCs and the like), digital photo frames, and portable gaming devices (not shown). Thus, the screen size of the display of the liquid crystal panel 11 included in the liquid crystal display device 10 is approximately a few inches to 10 inches, for example, or in other words, small- to mid-sized in general.

First, the backlight device 14 will be briefly explained. As shown in FIG. 2, the backlight device 14 has a substantially box-shaped chassis 14a with an opening in the front (facing the liquid crystal panel 11), light sources (not shown) such as cold cathode fluorescent tubes or LEDs arranged in the chassis 14a, and optical members (not shown) arranged so as to cover the opening of the chassis 14a. The optical members have functions such as converting light from the light sources into planar light.

Next, the liquid crystal panel 11 will be described. As shown in FIG. 1, the liquid crystal panel 11 has a horizontally-long quadrilateral (rectangular) shape as a whole, and the display area (active area) AA is disposed at a location near one edge in the short side direction of the panel (the top in FIG. 1) and one edge in the long side direction (the left side in FIG. 1). The drivers 21 and the flexible substrate 13 are disposed at a location near the other edge in the short side direction of the panel (the bottom in FIG. 1). In FIG. 1, the frame-shaped solid line that is slightly smaller than a CF substrate 11a represents the outer shape of the display area AA, and the region outside this solid line is the non-display area NAA. The region outside the display area AA of this liquid crystal panel 11 is the non-display area (non-active area) NAA where images are not displayed, and this non-display area NAA is constituted of: a substantially frame-shaped region surrounding the display area AA (a frame region on the CF substrate 11a, described later); a region secured at the other edge in the short side direction of the panel (a portion of the array substrate 11b that is exposed and does not overlap the CF substrate 11a, described later); and a region secured to the other edge in the long side direction of the panel (the right side in FIG. 1). Among these, the mounting area (attachment area) for the drivers 21 and the flexible substrate 13 is on the region secured at the edge in the other short side direction of the panel. The long side direction of the liquid crystal panel 11 matches the X axis direction in every drawing, and the short side direction thereof matches the Y axis direction in every drawing.

Figure 3:
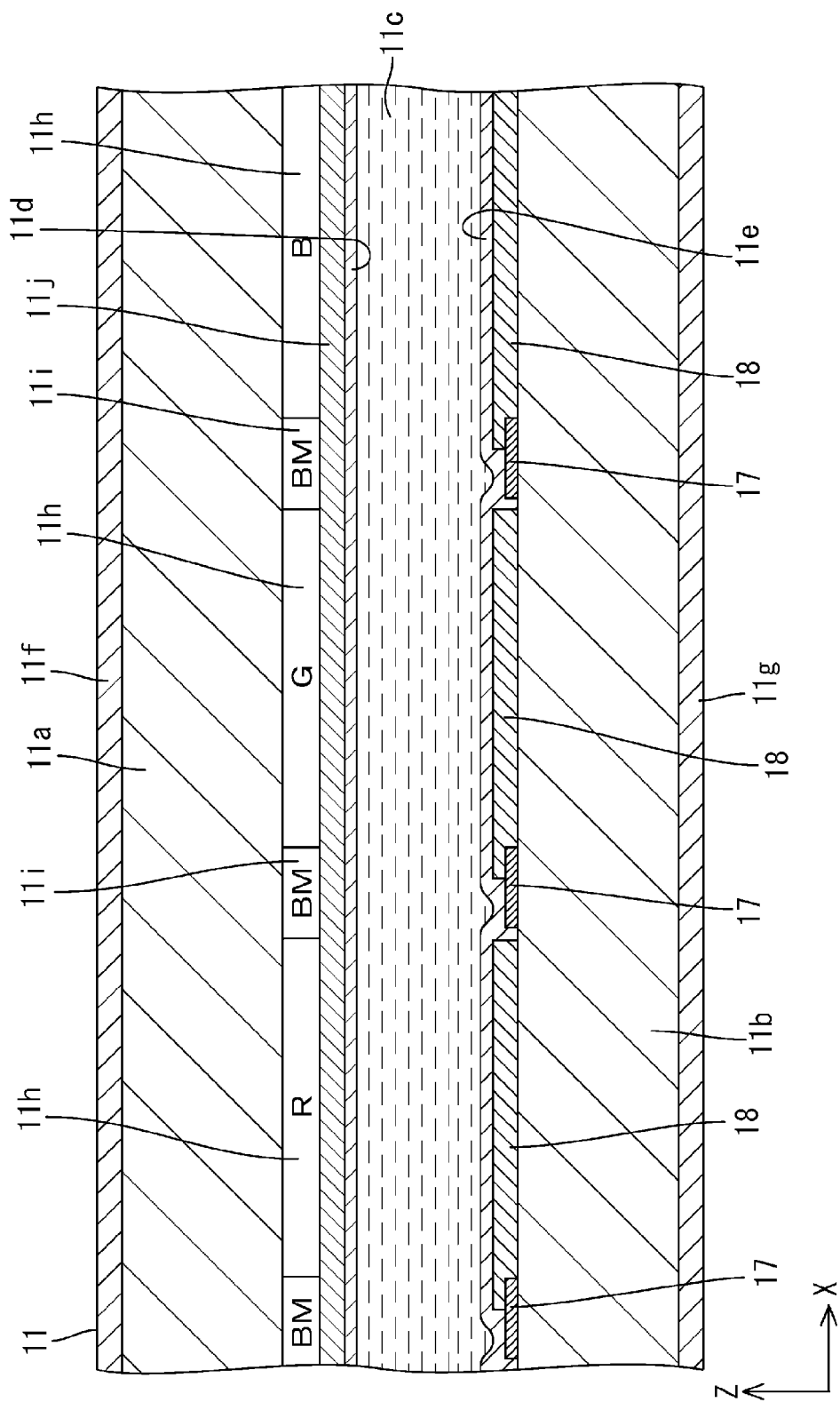
FIG. 3 is a cross-sectional view of the liquid crystal panel.

As shown in FIG. 3, the liquid crystal panel 11 includes a pair of transparent (having light transmissive characteristics) glass substrates 11a and 11b, and a liquid crystal layer 11c that is sandwiched between these two substrates 11a and 11b and that contains liquid crystal molecules, which is a substance whose optical characteristics change following application of an electric field thereto. The two substrates 11a and 11b are bonded together by a sealant (not shown) with a gap the same thickness as the liquid crystal layer 11c maintained therebetween. Of the two substrates 11a and 11b, the one on the front side (front surface side) is the CF substrate 11a, and the other on the rear side (rear surface side) is the array substrate 11b. Of these, as shown in FIGS. 1 and 2, the CF substrate 11a has smaller length dimensions than the array substrate 11b, and the two substrates are bonded together in a state in which one edge of the CF substrate 11a in the short side direction of the array substrate (the top in FIG. 1) and one edge of the CF substrate 11a in the long side direction (the left side in FIG. 1) coincide with the array substrate 11b. Accordingly, a prescribed amount of the other edge of the array substrate 11b in the short side direction thereof (the bottom in FIG. 1) and the other edge in the long side direction (the right side in FIG. 1) do not overlap with the CF substrate 11a, and the front and back of both substrates are exposed to the outside at these edges. The mounting region for the drivers 21 and the flexible substrate 13 (the arrangement region of terminals 22 to 24) are secured here, as described later. Alignment films 11d and 11e for orienting the liquid crystal molecules in the liquid crystal layer are respectively formed on the inner surfaces of the substrates 11a and 11b. On the respective outer surfaces of the two substrates 11a and 11b, polarizing plates 11f and 11g are bonded.

Figure 4:
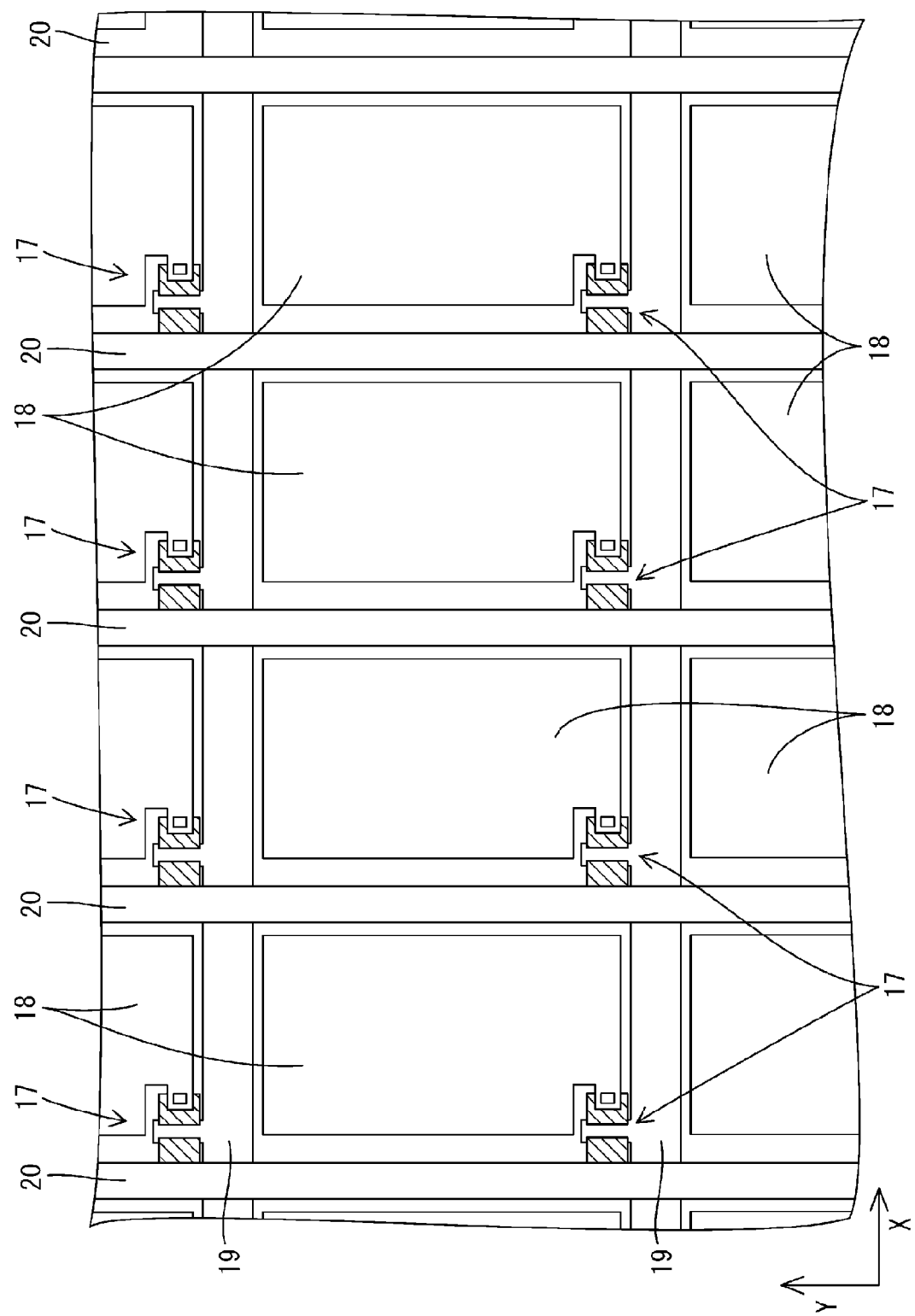
FIG. 4 is a plan view of a close-up configuration of an array substrate forming a portion of the liquid crystal panel.

Next, the configurations inside the display area AA on the array substrate 11b and the CF substrate 11a will be sequentially described in detail. As shown in FIGS. 3 and 4, a large number of TFTs (thin film transistors) 17, which are switching devices, and pixel electrodes 18 are arranged next to each other in a matrix on the inner surface side of the array substrate 11b (the liquid crystal layer side/the side facing the CF substrate 11a). Gate wiring lines 19 and source wiring lines 20 are disposed in a grid shape so as to surround these TFTs 17 and pixel electrodes 18. The gate wiring lines 19 and the source wiring lines 20 are all made of a metal material (conductive material), and an insulating film is interposed between the mutual intersections thereof. The gate wiring lines 19 and the source wiring lines 20 are respectively connected to the gate electrodes and the source electrodes of the TFTs 17, and the pixel electrodes 18 are connected to the drain electrodes of the TFTs 17, respectively. The pixel electrodes 18 have a vertically-long quadrilateral (rectangular) shape in a plan view and are made of a transparent electrode material such as ITO (indium tin oxide) or ZnO (zinc oxide). It is also possible to provide capacitance wiring lines (not shown) on the array substrate 11b that are parallel to the gate wiring lines 19 and that overlap the pixel electrodes 18 through the insulating layer.

Figure 5:
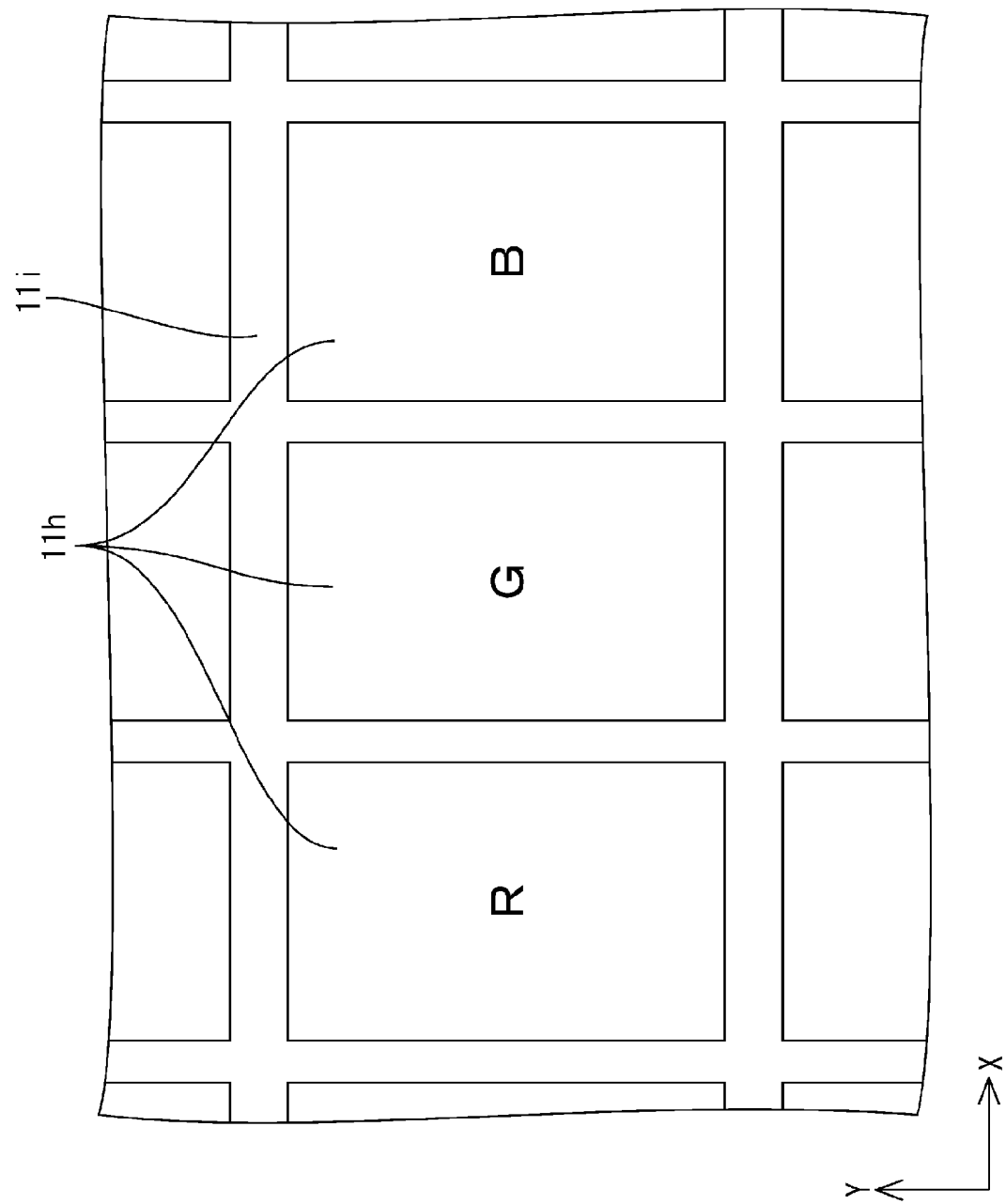
FIG. 5 is a plan view of a close-up configuration of a CF substrate forming a portion of the liquid crystal panel.

As shown in FIGS. 3 and 5, a large number of color filters 11h each having a colored portion such as R (red), G (green), and B (blue) arranged in a matrix are disposed on the CF substrate 11a so as to overlap the respective pixel electrodes 18 on the array substrate 11b in a plan view. A substantially grid-shaped light shielding layer (black matrix) 11i for preventing colors from mixing is formed between the respective colored portions constituting the color filter 11h. This light shielding layer 11i overlaps the gate wiring lines 19 and the source wiring lines 20 in a plan view. A block-shaped opposite electrode 11j that faces the pixel electrodes 18 on the array substrate 11b is disposed on the surface of the color filer 11h and the light shielding layer 11i.

As shown in FIGS. 1 and 2, the control circuit substrate 12 is attached to the rear surface of the chassis 14a of the backlight device 14 (the outer surface opposite to the liquid crystal panel 11) by screws or the like. This control circuit substrate 12 has power a source power component that supplies driving power and a reference potential to the drivers 21 and an electronic component (controller circuit) that controls transmission of input signals for images to the liquid crystal panel 11 mounted on a phenolic paper or glass epoxy resin substrate. Wiring lines of a prescribed pattern (conductive route) (not shown) are also formed by cabling on this substrate. One end of the flexible substrate 13 is electrically and mechanically connected to this circuit control substrate 12 via an ACF (anisotropic conductive film) (not shown).

As shown in FIG. 2, the flexible substrate (FPC substrate) 13 includes a base material made of a composite resin material having insulating and flexible characteristics (a polyimide resin or the like, for example). There are a large number of patterns (not shown) on the base material, and one end in the long direction of the flexible substrate 13 connects to the control circuit substrate 12 disposed on the rear of the chassis 14a and the other end is connected to the array substrate 11b of the liquid crystal panel 11, as described above; therefore, the flexible substrate 13 is bent in a cuff shape such that, inside the liquid crystal display device 10, the flexible substrate 13 has a substantially U-shaped cross section. The wiring patterns on both ends in the long direction of the flexible substrate 13 are exposed to the outside to form terminal sections (not shown), and these terminal sections are respectively electrically connected to the control circuit substrate 12 and the array substrate 11b. Due to this, it is possible for the driving power, reference potential, and input signal for images supplied from the control circuit substrate 12 to be transmitted to the liquid crystal panel 11 (see FIG. 9).

As shown in FIG. 1, the drivers 21 are constituted of an LSI chip having a driver circuit 21a therein, and operate on the basis of driving power and a reference potential supplied from the control circuit substrate 12, which is the power source, in order to generate output signals by processing input signals related to images supplied from the control circuit substrate 12, which is also the signal supply source. The output signals are outputted to the display area AA of the liquid crystal panel 11 (see FIG. 9). These drivers 21 have a horizontally-long quadrilateral shape in a plan view and are directly mounted on the non-display area NAA of the array substrate 11b of the liquid crystal panel 11. In other words, COG (chip on glass) mounting is used. The long side direction of the driver 21 matches the X axis direction, and the short side direction thereof matches the Y axis direction.

Next, the connection configuration of the flexible substrate 13 to the drivers 21 on the non-display area NAA of the array substrate 11 will be described in detail. As shown in FIG. 1, the drivers 21 and the edge of the flexible substrate 13 are attached to the portions of the non-display area NAA of the array substrate 11b that do not overlap the CF substrate 11a, or namely, the non-overlapping portions. The drivers 21 are disposed closer to the display area AA than the flexible substrate 13 on the array substrate 11b. In other words, the drivers 21 are sandwiched between the display area AA and the flexible substrate 13 in the non-display area NAA, whereas the flexible substrate 13 has the edge (attachment location) thereof disposed on the side of the drivers 21 that are opposite to the display area AA. The flexible substrate 13 has an end thereof attached to the center of the long side edge of the array substrate 11b, and this attached end extends along this long side edge (in the long side direction/X axis direction) of the array substrate 11b. The dimensions of the edge of the flexible substrate 13 attached to the array substrate 11b are smaller than the long side dimensions of the array substrate 11b, and are approximately half, for example.

On the other hand, as shown in FIG. 1, the drivers 21 are mounted on the non-display area NAA such that the long side direction of the drivers 21 coincide with the long side direction (X axis direction) of the array substrate 11b. Four of the drivers 21 are arranged in a straight line with spaces therebetween along the long side edge (long side direction/X axis direction) of the array substrate 11b. Of the four drivers 21 along the X axis direction, the two drivers 21 close to the center on the long side edge of the array substrate 11b are first drivers (first driver circuit sections) 21A arranged relatively close to the flexible substrate 13, whereas the two drivers 21 close to the ends of the long side direction of the array substrate 11 are second drivers (second driver circuit sections) 21B that are relatively far from the flexible substrate 13. When the drivers 21 are distinguished below, the letter "A" will be added onto the reference character to signify "first driver" and the letter "B" will be added onto the reference character to signify "second driver." When no distinction is made, the drivers will all be referred to in general, with no letter added thereto. The pair of first drivers 21A are arranged so as to overlap the flexible substrate 13 in the X axis direction, whereas the pair of second drivers 21B are arranged so as not to overlap the flexible substrate 13 in the X axis direction. This means that the size of the flexible substrate 13 in the X axis direction has been made smaller, as compared to if all of the drivers 21 overlapped the flexible substrate in the X axis direction. This allows for the flexible driver 13 itself to be made smaller and for the empty area on both sides of the flexible substrate 13 in the X axis direction to be used for arranging other components or the like, which makes this configuration have excellent convenience. The pair of first drivers 21A and the pair of second drivers 21B are arranged symmetrically on the left and right on the long edge of the array substrate 11b in FIG. 1.

Figure 6:
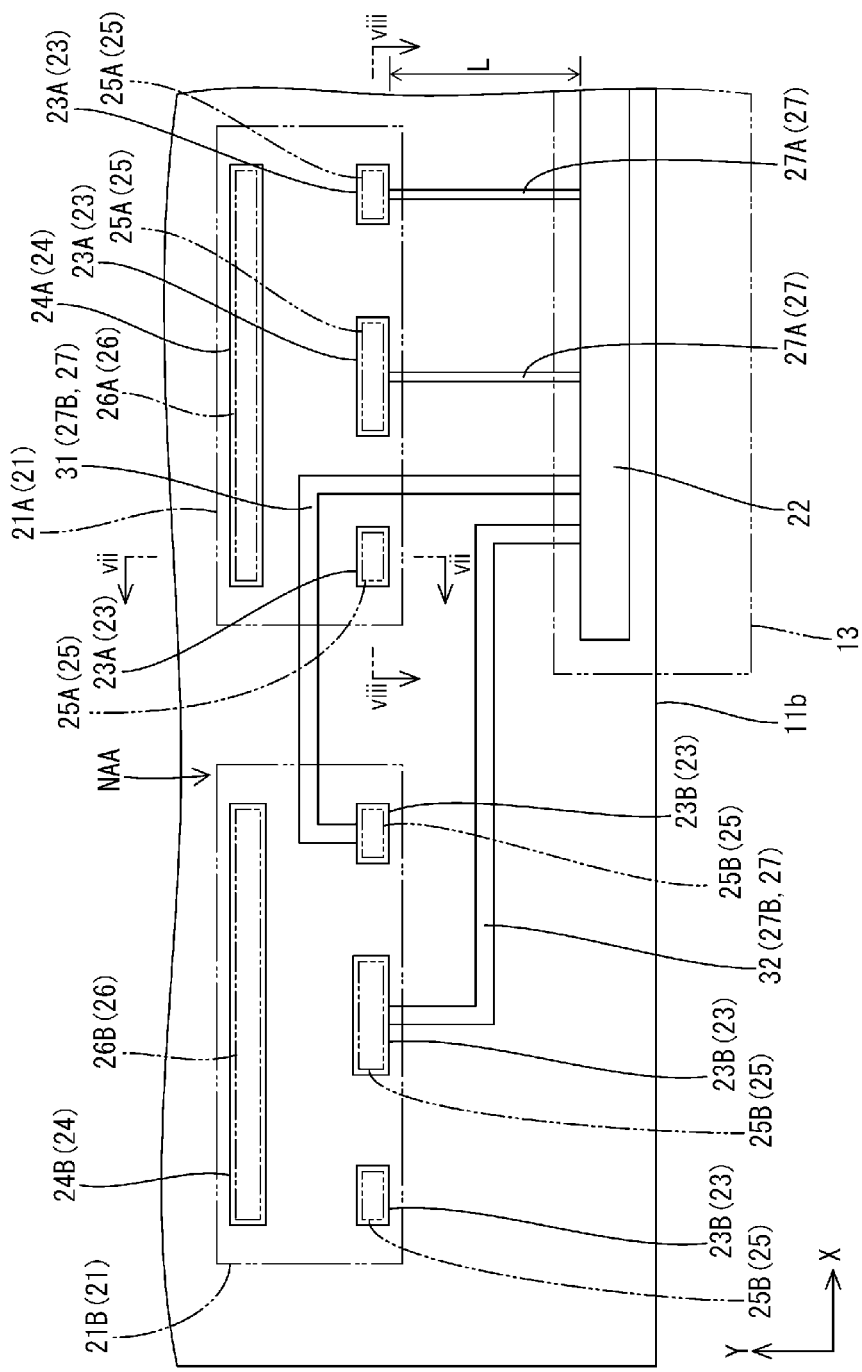
FIG. 6 is a close-up plan view of a mounting region of drivers and a flexible substrate on the array substrate forming a portion of the liquid crystal panel.

As shown in FIG. 6, the external connection terminal 22 that receives driving power, a reference potential, input signals, and the like from the flexible substrate 13 is formed on the mounting area (external connection member mounting area) of the flexible substrate 13 on the array substrate 11b. Meanwhile, input terminals 23 and output terminals 24 for transmitting driving power, a reference potential, input signals and output signals, and the like are disposed on the mounting area (driver circuit section mounting area) of the drivers 21 on the array substrate 11b. Driver input terminals (driver circuit section input terminals) 25 and driver output terminals (driver circuit section output terminals) 26 that respectively connect to the input terminals 23 and the output terminals 24 are disposed on the drivers 21. In FIG. 6, the drivers 21, the driver input terminals 25, and the driver output terminals 26 are shown by dashed-two dotted lines. In FIG. 6, the structure of the respective wiring lines and terminals relating to the two left drivers 21 shown in FIG. 1 are shown, but the structure of the respective wiring lines and terminals relating to the two right drivers 21 shown in FIG. 1 is reversed in FIG. 6. Connection wiring lines 27 that connect the external connection terminal 22 connected to the flexible substrate 13 to the input terminals 23 connected to the drivers 21 are disposed on the non-display area NAA of the array substrate 11b. There are a plurality of each of the terminals 22 to 26, and each of the terminals is constituted by a group of single terminals. In a similar manner, the connection wiring lines 27 are each constituted of a plurality of wiring lines, and each connection wiring line is constituted of a group of single wiring lines. In FIG. 6, the respective terminals 22 to 26 have been simplified to show single terminal groups, but in FIGS. 7 and 8, a plurality of the single terminals are each shown separately. In FIG. 6, the connection wiring lines 27 have been simplified to show single wiring line groups, but in FIGS. 7 and 8, a plurality of the single wiring lines are each shown separately.

Figure 7:
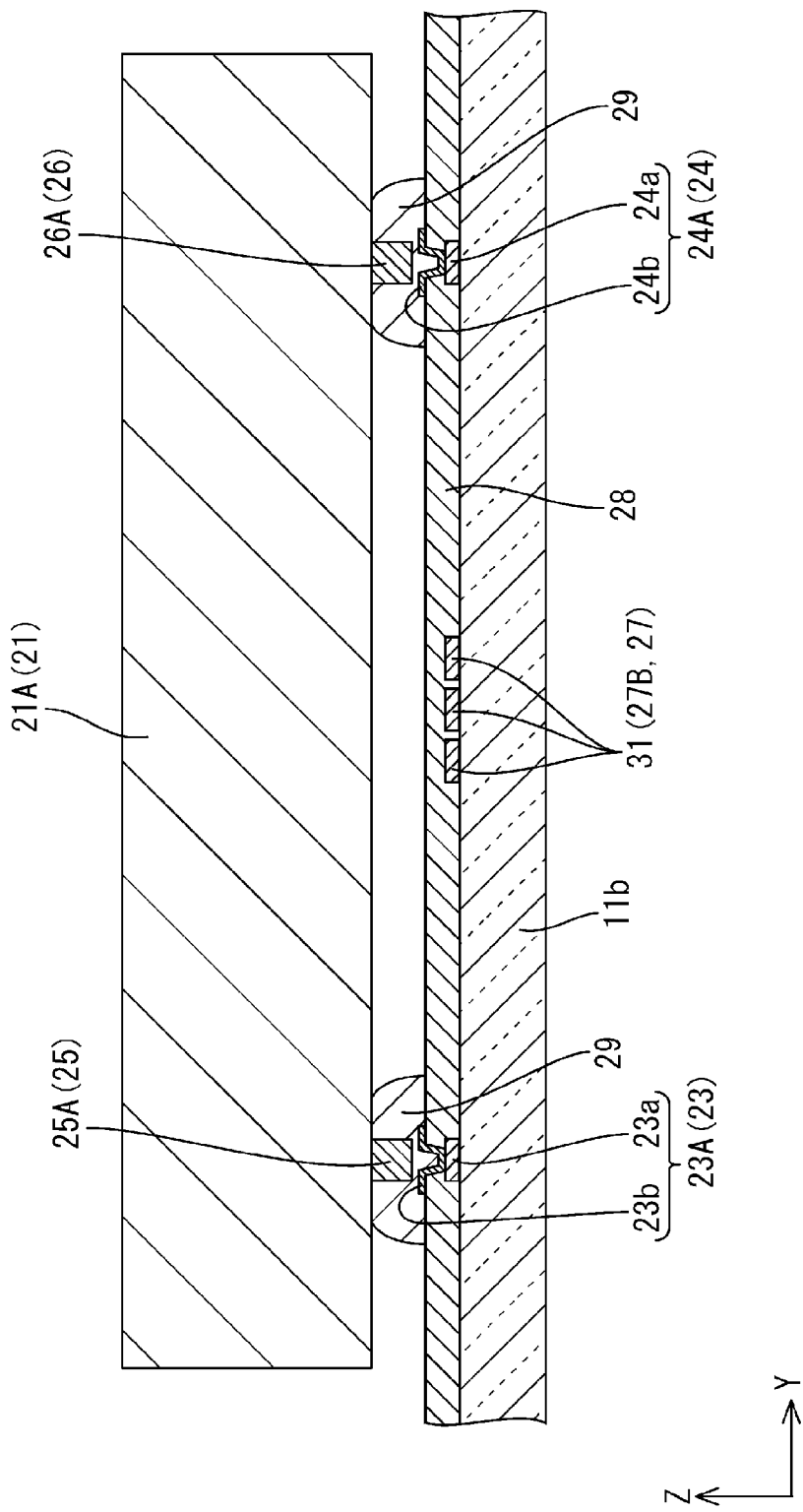
FIG. 7 is a cross-sectional view of FIG. 6 along the line vii-vii.

As shown in FIG. 7, the input terminals 23 and the output terminals 24 are respectively arranged to cover terminal members 23a and 24a made of the same metal material as the gate wiring lines 19 and the source wiring lines 20 and to also cover the surfaces of these terminal members 23a and 24a. The input terminals 23 and the output terminals 24 are respectively constituted of pads 23b and 24b made of the same ITO or ZnO transparent electrode material as the pixel electrodes 18, and can be patterned on the array substrate 11b using a well-known photolithography method at the same time in the manufacturing process as the liquid crystal panel 11 (array substrate 11b) when the gate wiring lines 19 or the source wiring lines 20 and the pixel electrodes 18 are patterned. An insulating layer 28 is layered on the front side of the terminal members 23a and 24a, and contact holes are formed in portions of this insulating layer 28. The pads 23b and 24b are connected to the terminals members 23a and 24a through these contact holes. An anisotropic conductive film (ACF) 29 is coated on the respective pads 23b and 24b of the input terminals 23 and the output terminals 24, and the driver input terminals 25 and the driver output terminals 26 of the drivers 21 are electrically connected to the respective pads 23b and 24b through the conductive particles (not shown) in this anisotropic conductive film 29. Although not shown, the external connection terminal 22 has a similar cross-sectional configuration to the input terminals 23 and the output terminals 24 described above and is electrically connected to the terminals of the flexible substrate 13 through the anisotropic conductive film.

Figure 8:
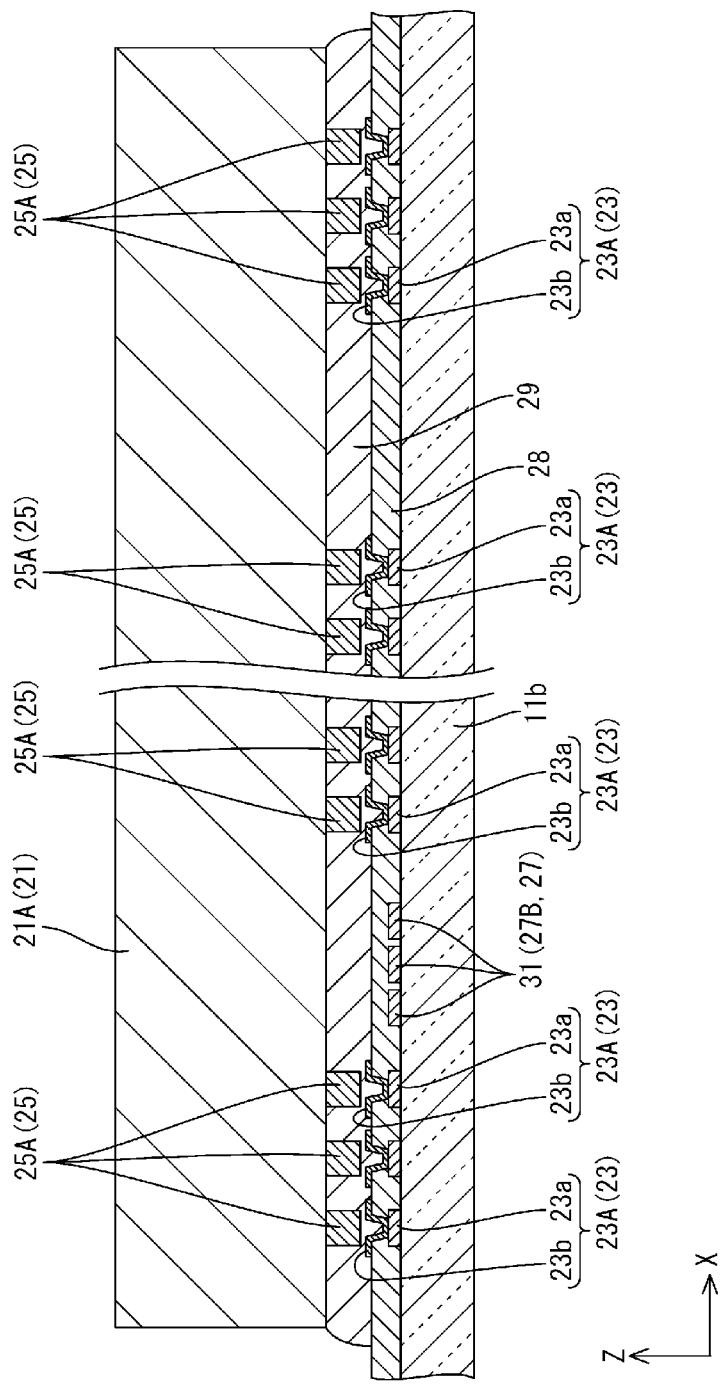
FIG. 8 is a cross-sectional view of FIG. 6 along the line viii-viii.

As shown in FIG. 6, the input terminals 23 and the output terminals 24 are arranged at the locations on the array substrate 11b overlapping the drivers 21 in a plan view, or in other words, at the mounting areas of the drivers 21. Among these, the input terminals 23 on the mounting area of the drivers 21 on the array substrate 11b are arranged near the flexible substrate 13 (the side opposite to the display area AA), whereas the output terminals 24 are arranged near the display area AA (the side opposite to the flexible substrate 13). Between the input terminals 23 and the output terminals 24, there is a gap of a prescribed width where no terminals are provided. A total of three of the input terminals 23 are arranged next to each other with spaces therebetween near the center of the long side direction of the drivers 21 and near both edges of the long side direction of the drivers 21. The number of single input terminals (single terminals) constituting the input terminals 23 at the center is more than the respective input terminals 23 near the edges. Between the center input terminals 23 and the respective input terminals 23 at the edges, there is a gap of a prescribed width where no single input terminals are provided (a non-arrangement region for single input terminals). As shown in FIG. 8, a plurality of the single input terminals of the respective input terminals 23 are arranged in a straight line in a row along the X axis direction. In a manner similar to the respective input terminals 23, a plurality of the single output terminals (single terminals) of the output terminals 24 are also arranged in a straight line in a row along the X axis. The output terminals 24, however, are not divided into three like the input terminals 23, and the single output terminals thereof are arranged along the X axis direction next to each other with no gap therebetween.

As shown in FIG. 7, the driver input terminal 25 and the driver output terminal 26 are made of a metal material with excellent conductivity such as gold and have a bump shape that protrudes from the bottom of the driver 21 (from the surface facing the array substrate 11b). The driver input terminal 25 and the driver output terminal 26 are respectively electrically connected to the respective pads 23b and 24b of the input terminal 23 and the output terminal 24 through the anisotropic conductive film 29. The driver input terminal 25 and the driver output terminal 26 are respectively connected to a processing circuit section 30 inside the driver 21. After an input signal received from the driver input terminal 25 and processed in the processing circuit section 30, it can be outputted to the driver output terminal 26 (see FIG. 9). As shown in FIG. 6, three of the driver input terminals 25 are arranged next to each other with spaces therebetween along the X axis direction, in a manner similar to the input terminals 23, whereas each of the driver output terminals 26 has a horizontally-long shape that extends substantially the whole length of the driver 21. A plurality of single driver input terminals and single driver output terminals (single terminals) of the driver input terminals 25 and the driver output terminals 26 are arranged next to each other in a straight line along the X axis direction, in a manner similar to the input terminals 23 and the output terminals 24.

As shown in FIG. 6, the connection wiring lines 27 are made of the same metal material as the gate wiring lines 19 and the source wiring lines 20 and can be patterned on the array substrate 11b using a well-known photolithography method at the same time in the manufacturing process as the liquid crystal panel 11 (array substrate 11b) when the gate wiring lines 19 or source wiring lines 20 and pixel electrodes 18 are patterned. The connection wiring lines 27 are formed so as to pass through a prescribed route that connects the external connection terminal 22 to the input terminals 23 on the non-display area NAA of the array substrate 11b. One end of the connection wiring lines 27 is connected to the external connection terminal 22 and the other end is connected to the input terminals 23. This makes it possible for the input signals and the like supplied to the external connection terminal 22 via the flexible substrate 13 to be transmitted to the input terminals 23 through the connection wiring lines 27 (see FIG. 9). In the present embodiment, two of the connection wiring lines 27 are provided for every two of the three input terminals 23 on the mounting area of each of the drivers 21. Specifically, different connection wiring lines 27 are connected to two of the input terminals 23 located in the center and the right edge (near the flexible substrate 13) of the mounting area of each driver 21 in FIG. 6, but there is no connection wiring line 27 connected to the input terminal 23 located on the left edge (far from the flexible substrate 13). Therefore, the input terminal 23 on the left edge in FIG. 6 is a dummy terminal that cannot receive signals from the flexible substrate 13. The input terminal 23 that is a dummy terminal can receive the driver input terminals 25 in a manner similar to the input terminals 23 connected to the connection wiring lines 27, and thus, the dummy terminal contributes to stabilizing the connection state of the input terminals 23 connected to the connection wiring lines 27. As shown in FIGS. 7 and 8, the insulating layer 28 is formed over substantially the entire front side (side opposite to the array substrate 11b) of the connection wiring lines 27 except for the areas connecting to the external connection terminals 22 and the input terminals 23. The output terminals 24 can output signals to the respective wiring lines 19 and 20 by connecting to drawn-out wiring lines (not shown) that continue from the wiring lines such as the gate wiring lines 19 and the source wiring lines 20 arranged in the display area AA.

Hereinafter, the input terminals 23 and the output terminals 24 formed on the mounting area of the first driver 21A are respectively the first input terminals 23A and the first output terminals 24A, the driver input terminals 25 and the driver output terminals 26 of the first driver 21A are respectively the first driver input terminals 25A and the first driver output terminals 26A, and the connection wiring lines 27 connected to the first input terminals 23A are the first connection wiring lines 27A. In a similar manner, the input terminals 23 and the output terminals 24 formed on the mounting area of the second driver 21B are respectively the second input terminals 23B and the second output terminals 24B, the driver input terminals 25 and the driver output terminals 26 of the second driver 21B are respectively the second driver input terminals 25B and the second driver output terminals 26B, and the connection wiring lines 27 connected to the second input sections 23B are the second connection wiring lines 27B. When distinguishing the input terminals 23, the output terminals 24, the driver input terminals 25, the driver output terminals 26, and the connection wiring lines 27, the letter "A" is attached to the relevant term starting with "first," or the letter "B" is attached to the relevant term starting with "second," and when referring to these components in general, no letter is added.

Among the connection wiring lines 27 in the present embodiment, as shown in FIG. 6, an overlapping connection wiring line 31 that partially overlaps the first driver 21A relatively close to the flexible substrate 13 is included as a portion of the second connection wiring lines 27B that connect the second input terminals 23B connecting to the second driver 21B relatively far from the flexible substrate 13 to the external connection terminal 22. A non-overlapping connection wiring line 32 that does not overlap the first driver 21A relatively near the flexible substrate 13 is also included as a portion of the second connection wiring lines 27B.

First, the non-overlapping connection wiring line 32 will be described. As shown in FIG. 6, the non-overlapping connection wiring line 32 is connected to the second input terminal 23B located in the center shown in FIG. 6 on the mounting area of the second driver 21B. The non-overlapping connection wiring line 32 does not pass through the mounting area of the first driver 21A over substantially the whole area from the second input terminal 23B to the external connection terminal 22. More specifically, the non-overlapping connection wiring line 32 extends from the left side (the second driver 21B side) of the portion of the external connection terminal 22 overlapping the first driver 21A in the X axis direction as shown in FIG. 6 towards the top (display area AA side) in FIG. 6, after which the non-overlapping connection wiring line 32 bends towards the left side (second driver 21B side) shown in FIG. 6 at a location right before the mounting area of the first driver 21A. Thereafter, the non-overlapping connection wiring line 32 extends towards the left side as shown in FIG. 6 along the X axis direction, bends towards the top of FIG. 6, and then connects to the second input terminal 23B located in the center of the second driver in FIG. 6. In this manner, the entirety of the non-overlapping connection wiring line 32 is formed so as to pass through the area between the external connection terminal 22 and the input terminals 23 in the Y axis direction (the arrangement direction of the flexible substrate 13 and the drivers 21) on the non-display area NAA.

Specifically, as shown in FIG. 6, the overlapping connection wiring line 31 is connected to the second input terminal 23B on the right edge of the mounting area of the second driver 21B shown in FIG. 6, and the portion of the overlapping connection wiring line 31 between the second input terminal 23B and the external connection terminal 22 passes through the mounting area of the first driver 21A. More specifically, the overlapping connection wiring line 31 extends along the Y axis direction to the right of the non-overlapping connection wiring line 32 (the first driver 21A side) as shown in FIG. 6 from the portion of the external connection terminal 22 overlapping the first driver 21A in the X axis direction towards the top (display area AA side) in FIG. 6, after which the overlapping connection wiring line 31 passes between the two first input terminals 23A on the center and left edge of the mounting area of the first driver 21A in FIG. 6 and then bends towards the left side (second driver 21B side) shown in FIG. 6. Thereafter, the overlapping connection wiring line 31 extends towards the left side in FIG. 6 along the X axis direction and passes between the first input terminal 23A and the first output terminal 24A on the left edge of the mounting area of the first driver 21A in FIG. 6 and extends to outside of the mounting area of the first driver 21A. The substantially "L"-shaped portion of the overlapping connection wiring line 31 that passes between the two first input terminals 23A and then passes between the first input terminal 23A and the first output terminal 24A overlaps the first driver 21A. Having extended to outside of the mounting area of the first driver 21A, the overlapping connection wiring line 31 then extends towards the left side in FIG. 6 along the X axis direction, passes between the second input terminal 23B and the second output terminal 24B on the right edge of the mounting area of the second driver 21B in FIG. 6, and then bends towards the bottom of FIG. 6 (the side opposite to the display area AA). Thereafter, the overlapping connection wiring line 31 connects to the second input terminal 23B on the right edge of the mounting area of the second driver in FIG. 6. Accordingly, the overlapping connection wiring line 31 is disposed on side of the second input terminal 23B that is the member to be connected facing the second output terminal 24B, and is not disposed on the side opposite thereto (the flexible substrate 13 side).

In this manner, the overlapping connection wiring line 31 is included as a portion of the second connection wiring lines 27B; therefore, the amount that the overlapping connection wiring line 31 overlaps the first driver 21A can be secured as favorable arrangement space for the non-overlapping connection wiring line 32 on the non-display area NAA. Specifically, the overlapping connection wiring line 31 passes through a route overlapping the first driver 21A rather than going between the external connection terminal 22 and the first input terminal 23A. In contrast, the non-overlapping connection wiring line 32 is disposed between the external connection terminal 22 and the input terminals 23 in the Y axis direction (the arrangement direction of the flexible substrate 13 and the drivers 21) on the non-display area NAA, but the overlapping connection wiring line 31 is not adjacent to the non-overlapping connection wiring line 32 in the Y axis direction in this area. Accordingly, when providing the non-overlapping connection wiring line 32 in this area, the wiring route and line width thereof can be relatively freely configured without regard for the overlapping connection wiring line 31. In other words, it is possible to reduce a dimension L of the area necessary for providing the non-overlapping connection wiring line 32 having a prescribed wiring route and line width. Meanwhile, the overlapping connection wiring line 31 has a route that passes through a different area than the non-overlapping connection wiring line 32; thus, this allows for the wiring route and line width thereof to be relatively freely configured without regard for the non-overlapping connection wiring line 32. Due to this, the line width of the second connection wiring lines 27B constituted of the overlapping connection wiring line 31 and the non-overlapping connection wiring line 32 can be made wider than the line width of the first connection wiring lines 27A; therefore, it is possible to equalize the wiring resistance between the first connection wiring lines 27A, which are relatively short, and the second connection wiring lines 27B, which are relatively long. Furthermore, it is possible to reduce the area between the external connection terminal 22 and the output terminals 23 in the Y axis direction on the non-display area NAA. This is suitable for making the outer shape of the liquid crystal display device 10 smaller, narrowing the frames thereof, and the like.

If the portion of the overlapping connection wiring line that overlaps the first driver 21A were to be disposed on the first driver 21A instead of the array substrate 11b, then the overlapping portion on the first driver 21A side would need to be connected by at least two places to the overlapping connection wiring line on the array substrate 11b side; therefore, the connection reliability would be low and instability in the wiring resistance could occur due to unevenness in the connection state, among other problems. In the present embodiment, however, the non-overlapping connection wiring line 32 is formed over the entire array substrate 11b, and thus these problems do not occur, and a high connection reliability and stable wiring resistance can be achieved.

The present embodiment has the above-mentioned structure, and the operation thereof will be explained next. As shown in FIGS. 1 and 2, if the power source of the liquid crystal display device 10 is turned ON, then various types of signals and the like related to images are supplied from the control circuit substrate 12 to the liquid crystal panel 11 through the flexible substrate 13, and a prescribed image is displayed on the display area AA of the liquid crystal panel 11 by light from the light sources in the backlight device 14 being illuminated on the liquid crystal panel 11. The transmission route of the signals and the like related to images supplied to the liquid crystal panel 11 will be explained in detail below.

Figure 9:
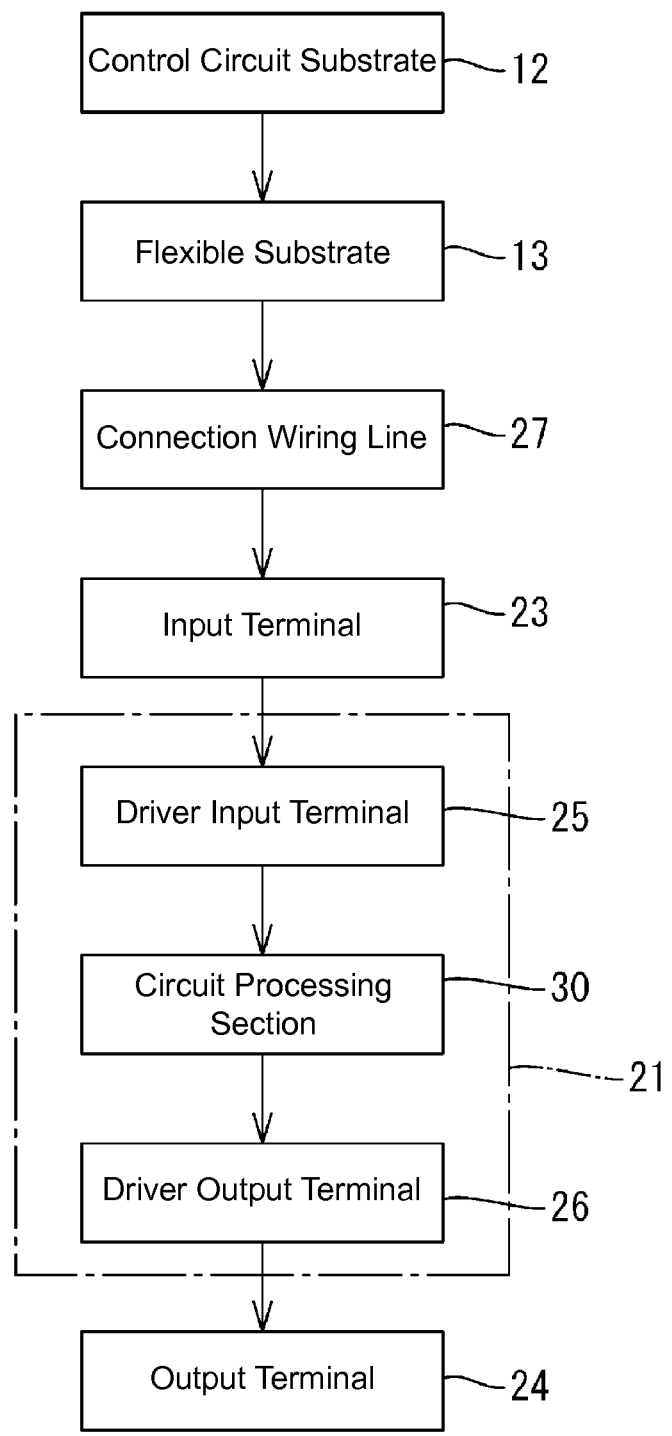
FIG. 9 is a block view of a signal transmission route.

As shown in FIGS. 1 and 9, driving power, a reference potential, and the input signals for the respective drivers 21 generated in the control circuit substrate 12 are respectively supplied to the external connection terminal 22 of the array substrate 11b of the liquid crystal panel 11 through the flexible substrate 13. As shown in FIGS. 6 and 9, the driving power, reference potential, and input signals supplied to the external connection terminal 22 are each transmitted to the input terminals 23 arranged on the mounting area of the respective drivers 21 through the respective connection wiring lines 27. The second connection wiring lines 27B are connected to the second input terminals 23B on the second driver 21B, which is relatively far from the flexible substrate 13. Even though the wiring line length of the second connection wiring lines is longer than the first connection wiring lines 27A that connect to the first input terminals 23A of the first driver 21A, which is relatively near to the flexible substrate 13, the wiring line width of the second connection wiring lines 27B is wider than that of the first connection wiring lines 27A, and thus, the wiring resistance of the second connection wiring lines 27B is approximately the same as the first connection wiring lines 27A. Accordingly, the input signals transmitted to the first input terminals 23A via the first connection wiring lines 27A and the input signals transmitted to the second terminals 23B via the second connection wiring lines 27B are not susceptible to rounding, and a favorable signal transmittance can be achieved.

As shown in FIGS. 8 and 9, the driving power, reference potential, and input signals transmitted to the input terminals 23 through the connection wiring lines 27 are supplied to the driver input terminals 24 of the drivers 21 through the conductive particles in the anisotropic conductive film 29. The drivers 21 receive the driving power and the reference potential and process the inputted signals at the signal processing section 30, and then generate output signals. As shown in FIGS. 7 and 9, the generated output signals are supplied to the output terminals 24 from the driver output terminals 25 via the conductive particles in the anisotropic conductive film 29, and then the output signals are supplied to the respective wiring lines 19 and 20 in the display area AA. This displays a prescribed image on the display area AA of the liquid crystal panel 11.

As described above, the liquid crystal display device (display device) 10 of the present embodiment includes: the liquid crystal display panel (display panel) 11 having the display area AA that can display an image and the non-display area NAA outside of this display area AA; the flexible substrate (external connection member) 13 attached to the non-display area NAA of the liquid crystal display panel 11 for connecting to the control circuit substrate (external signal supply source) 12; the plurality of connection wiring lines 27 disposed in the non-display area NAA of the liquid crystal display panel 11; and the plurality of drivers (driver circuit sections) 21 attached to the non-display area NAA of the liquid crystal display panel 11 and connected to the flexible substrate 13 by the connection wiring lines 27, the drivers 21 receiving input signals from the control circuit substrate 12 via the flexible substrate 13 and transmitting an output signal to the liquid crystal display panel 11, thereby driving the liquid crystal display panel 11; wherein the plurality of drivers 21 include the first driver (first driver circuit section) 21A and the second driver (second driver circuit section) 21B that is disposed further towards a side of the non-display area NAA opposite to the flexible substrate 13 than the first driver 21A, and wherein the plurality of connection wiring lines 27 include the non-overlapping connection wiring line 32 and the overlapping connection wiring line 31, the non-overlapping connection wiring line 32 connecting the second driver 21B to the flexible substrate 13 and being disposed so as not to overlap the first driver 21A, and the overlapping connection wiring line 31 connecting the second driver 21B to the flexible substrate 13 and having at least a portion thereof overlapping the first driver 21A.

With this configuration, input signals from the control circuit substrate 12 are supplied to the plurality of drivers 21 via the flexible substrate 13 and the plurality of connection wiring lines 27. The plurality of drivers 21 process the received input signals and generate output signals, which are outputted to the display area AA to allow driving of the liquid crystal panel 11. In terms of equalizing the wiring resistance among the plurality of connection wiring lines 27, it is preferable to increase the line width of the connection wiring lines 27 that connect the second driver 21B, which is relatively far from the flexible substrate 13, to the flexible substrate 13, but this risks increasing the arrangement space for these connection wiring lines 27 in the non-display area NAA. In this regard, since the overlapping connection wiring line 31 that connects the second driver 21B relatively far from the flexible substrate 13 to the flexible substrate 13 and that has at least a portion thereof overlapping the first driver 21A relatively close to the flexible substrate 13 is included as a one of these plurality of connection wiring lines 27, the amount that the overlapping connection wiring line 31 overlaps the first driver 21A can be used to secure a favorable amount of arrangement space for the non-overlapping connection wiring line 32, which connects the second driver 21B to the flexible substrate 13 in the non-display area NAA and which does not overlap the first driver 21A. Accordingly, it is possible for the non-display area NAA to be kept small while equalizing the wiring resistance of the connection wiring lines 27 that connect the first driver 21A to the flexible substrate 13 and the connection wiring lines 27 that connect the second driver 21B to the flexible substrate 13. Since the non-display area NAA is kept small, this configuration is suitable for decreasing the outer shape of the liquid crystal display device 10, narrowing the frame region, and the like. According to the present embodiment, it is possible to for the non-display area NAA to be kept small.

Furthermore, the first connection wiring lines 27A that connect the first driver 21A to the flexible substrate 13 and the second connection wiring lines 27B that connect the second driver 21B to the flexible substrate 13 are included as portions of the plurality of connection wiring lines 27, and among these, the overlapping connection wiring line 31 and the non-overlapping connection wiring line 32 are included as members of the second connection wiring lines 27B. The second connection wiring lines 27B are formed to have a larger line width than the first connection wiring lines 27A. With this configuration, it is possible to equalize the wiring resistance of the first connection wiring lines 27A that are relatively short and the second connection wiring lines 27B that are relatively long. Due to this, the inputted signals supplied to the first driver 21A and the second driver 21B via the first connection wiring lines 27A and the second connection wiring lines 27B are not susceptible to rounding or the like. Furthermore, it is possible to suppress the necessary costs for providing the first connection wiring lines 27A and the second connection wiring lines 27B, as compared to if the equalization of wiring resistance was attempted with the first connection wiring lines 27A and the second connection wiring lines 27B having different thicknesses and materials.

The attachment location of the flexible substrate 13 to the liquid crystal panel 11 extends along the edge of the liquid crystal panel 11, whereas the plurality of drivers 21 are aligned with gaps therebetween along the edge of the liquid crystal panel 11. With this configuration, the plurality of drivers 21 are aligned with spaces therebetween along the edge of the liquid crystal panel 11, or namely, along the direction in which the flexible substrate 13 extends; therefore, the second driver 21B is disposed farther away from the flexible substrate 13 than the first driver 21A. Even with this arrangement, the overlapping connection wiring line 31 is included as one of the connection wiring lines 27, as described above, thereby making it possible for the amount that the overlapping connection wiring line 31 overlaps the first driver 21A to be secured as a favorable arrangement space for the non-overlapping connection wiring line 32 that connects the second driver 21B to the flexible substrate 13 in the non-display area NAA, thus allowing for the non-display area NAA to be kept small.

The first driver 21A overlaps the flexible substrate 13 in the direction along the edge of the liquid crystal panel 11, whereas the second driver 21B does not overlap the flexible substrate 13 in the direction along the edge of the liquid crystal panel 11. With this configuration, the connection wiring lines 27 that connect the second driver 21B to the flexible substrate 13 has a more complicated wiring structure than the connection wiring lines 27 that connect the first driver 21A to the flexible substrate 13. Therefore, securing space for the arrangement thereof is more difficult. In this regard, the overlapping connection wiring line 31 is included as one of the connection wiring lines 27, as described above, thereby making it possible for the amount that the overlapping connection wiring line 31 overlaps the first driver 21A to be secured as a favorable arrangement space for the non-overlapping connection wiring line 32 that connects the second driver 21B to the flexible substrate 13 in the non-display area NAA, and thus allowing for the non-display area NAA to be kept small.

The first driver 21A is disposed close to the center on the end of the liquid crystal panel 11, whereas the second driver 21B is disposed close to the edge on the end of the liquid crystal panel 11. The flexible substrate 13 is disposed in the center on the end of the liquid crystal panel 11. With this configuration, the driver 21 that is disposed close to the edge on the end of the liquid crystal panel 11 is the second driver 21B that is connected to the flexible substrate 13 by the overlapping connection wiring line 31, thereby making it possible for the flexible substrate 13 to be attached to the center of the end of the liquid crystal panel 11.

A pair of the first drivers 21A are aligned near the center on the end of the liquid crystal panel 11, whereas a pair of the second drivers 21B are aligned near the edges on the end of the liquid crystal panel 11. With this configuration, even if at least four of the drivers 21 are arranged next to each other, the pair of second drivers 21B near the edges are respectively connected to the flexible substrate 13 by the overlapping connection wiring line 31, thereby making it possible to secure a favorable amount of arrangement space for the non-overlapping connection wiring line 32 that respectively connects the pair of second drivers 21B to the flexible substrate 13. This makes it possible for the non-display area NAA to be kept small.

The insulating layer 28 is formed on the overlapping connection wiring line 31 so as to be layered on the first driver 21A side that overlaps the overlapping connection wiring line 31. With this configuration, a situation in which the overlapping connection wiring line 31 is accidentally connected to the first driver 21A through the insulating layer 28 can be avoided.

On the non-display area NAA of the liquid crystal panel 11, there are a plurality of the first input terminals 23A that connect to the first driver 21A and a plurality of the first output terminals 24A connecting to the first driver 21A that are disposed closer to the display area AA than the first input terminals 23A. The overlapping connection wiring line 31 passes through at least one of between the plurality of first input terminals 23A and between the first input terminals 23A and the first output terminals 24A to connect to the second driver 21B. With this configuration, the overlapping connection wiring line 31 that overlaps the first driver 21A passes through at least one of between the plurality of first input terminals 23A and between the first input terminals 23A and the first output terminals 24A to connect to the second driver 21B. The overlapping connection wiring line 31 does not pass through the plurality of first output terminals 24A, and thus, it is not necessary to provide a structure for preventing the overlapping connection wiring line 31 from short-circuiting with the first output terminals 24A, as compared to if the overlapping connection wiring line 31 passed through the plurality of first output terminals 24A. This makes it possible to suppress the manufacturing costs of the liquid crystal panel 11.

On the non-display area NAA of the liquid crystal panel 11, there are a plurality of the second input terminals 23B that connect to the second driver 21B and a plurality of the second output terminals 24B connecting to the second driver 23B that are disposed closer to the display area AA than the second input terminals 23B. The overlapping connection wiring line 31 passes between the plurality of first input terminals 23A, between the first input terminal 23A and the first output terminal 24A, and between the second input terminal 23B and the second output terminal 24B to connect to the second input terminal 23B. With this configuration, the amount that the overlapping connection wiring line 31 is not disposed on the side of the second input terminal 23B opposite to the second output terminal 24B can be secured as favorable space for arrangement, as compared to if the overlapping connection wiring line were to connect from the side of the second input terminal 23B that is opposite to the second output terminal 24B. This makes it possible to secure a favorable arrangement space for the non-overlapping connection wiring line 32, thereby allowing for the non-display area NAA to be kept small.

<Embodiment 2>

Embodiment 2 of the present invention will be described with reference to FIGS. 10 and 11. In Embodiment 2, there are three drivers 121 at different distances from a flexible substrate 113. Descriptions of structures, operations, and effects similar to those of Embodiment 1 will be omitted.

Figure 10:
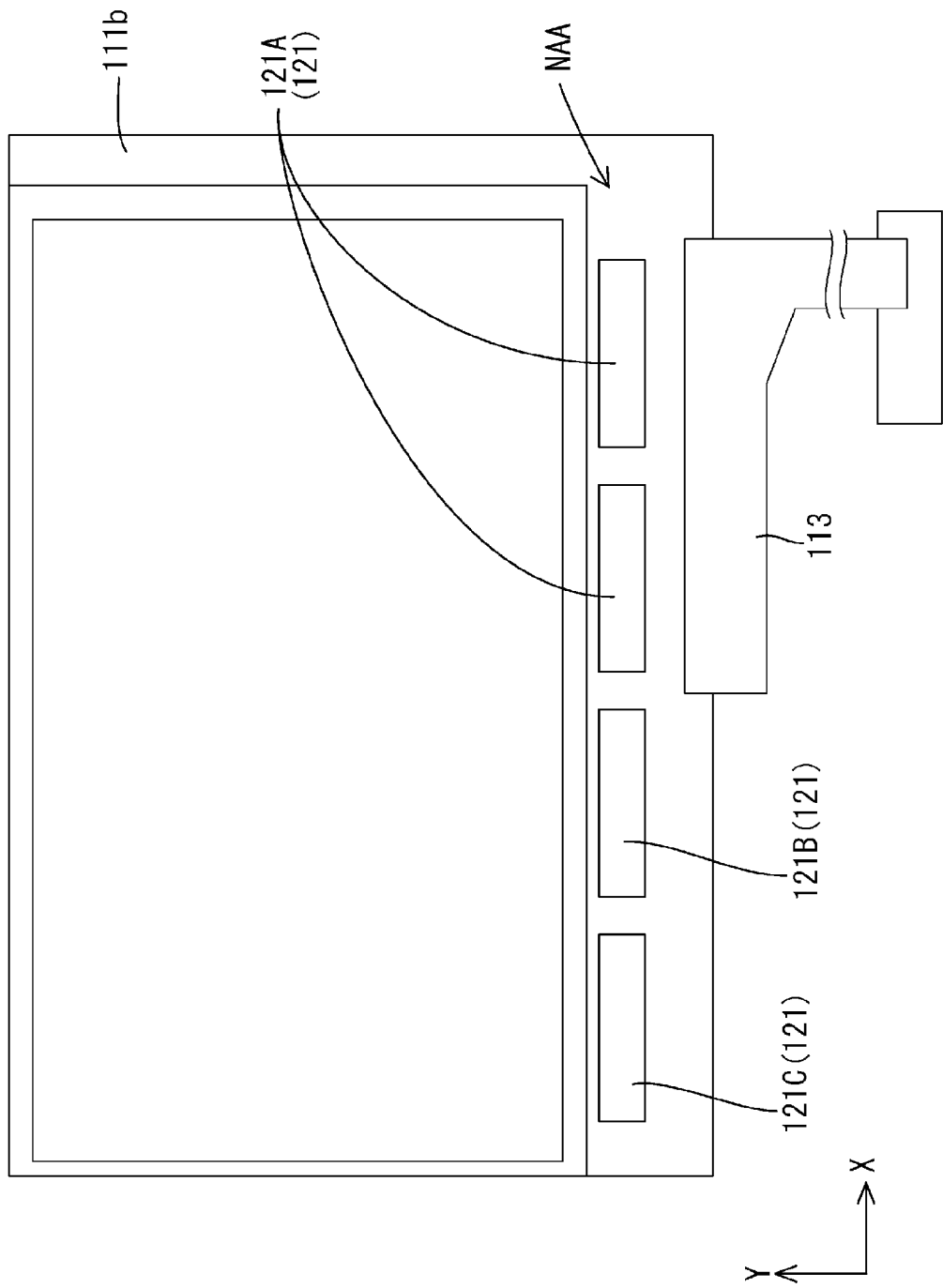
FIG. 10 is a schematic plan view of a connection configuration of a liquid crystal panel having drivers mounted thereon and a flexible substrate and control circuit substrate according to Embodiment 2 of the present invention.

As shown in FIG. 10, the flexible substrate 113 according to the present embodiment is located on the right side on an end of an array substrate 111*b* in the drawing. Specifically, among the four drivers arranged in a row along the X axis direction on the array substrate 111*b*, the flexible substrate 113 overlaps the two drivers 121 on the right in the X axis direction as shown in FIG. 10, but does not overlap the two drivers 121 on the left in the X axis direction. Accordingly, among the four drivers 121, the two drivers 121 on the right in FIG. 10 have the shortest distance to the flexible substrate 113 and are substantially equal first drivers 121A, whereas the center driver 121 among the two drivers towards the left in FIG. 10 is a second driver 121B that is the second closest to the flexible substrate among these two drivers, and the driver 121 on the left edge in the drawing is a third driver 121C that is located furthest from the flexible substrate 113, i.e., further from the flexible substrate 113 than the second driver 121B. Hereinafter, when distinguishing among the drivers 121, the letter "A" is added to the "first driver," the letter "B" is added to the "second driver," and the letter "C" is added to the "third driver," and if being referred to in general with no distinction, then no letter is added. The arrangement configuration of the respective terminals related to the first drivers 121A and the second driver 121B is as described in Embodiment 1 above, and a duplicate explanation will be omitted.

Figure 11:
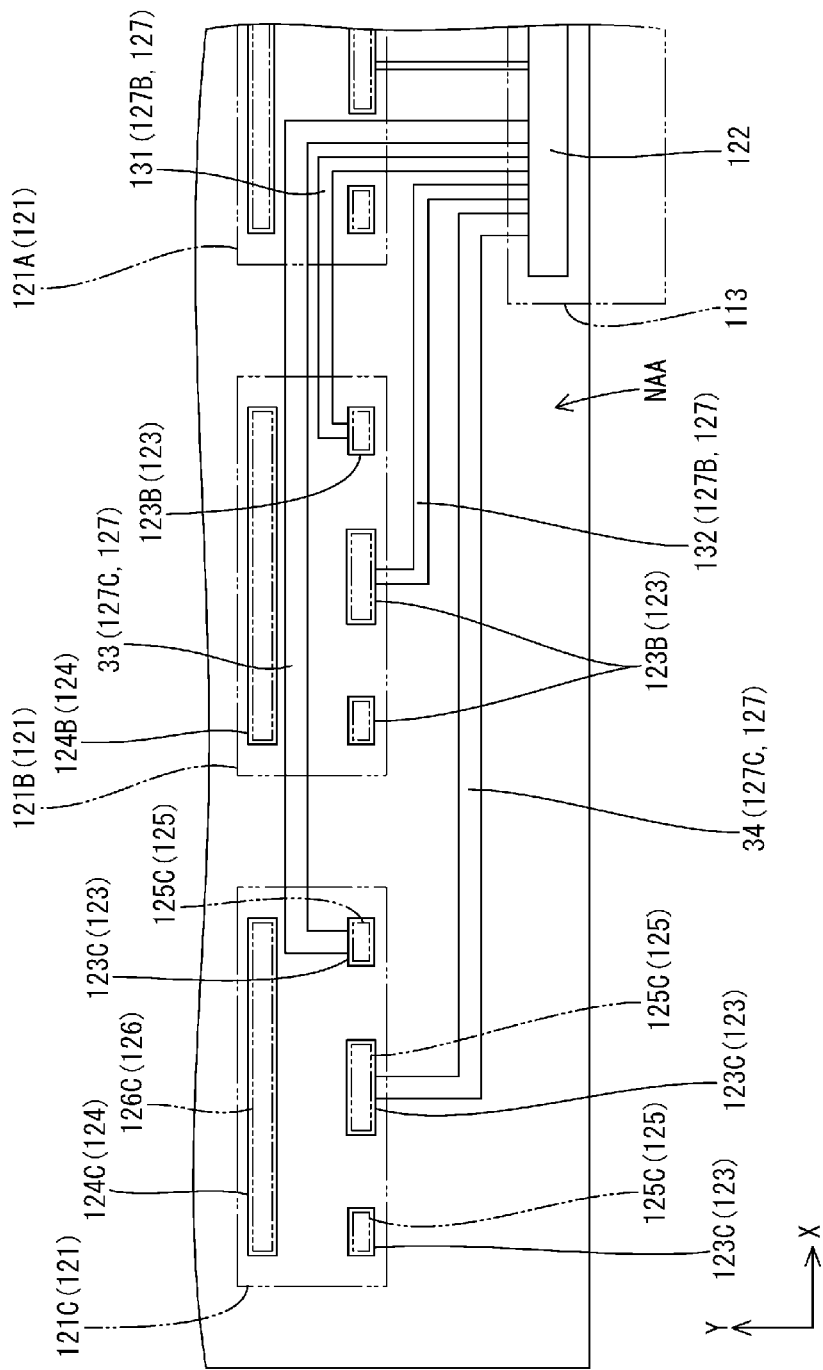
FIG. 11 is a close-up plan view of a mounting region of drivers and a flexible substrate on an array substrate forming a portion of a liquid crystal panel.

In the present embodiment, as shown in FIG. 11, input terminals 123 and output terminals 124 formed on the mounting area of the third driver 121C are, respectively, third input terminals 123 and third output terminals 124C. Driver input terminals 125 and a driver output terminal 126 of the third driver 121C are, respectively, third driver input terminals 125C and the third driver output terminals 126C. Connection wiring lines 127 connected to the third input terminals 123C are third connection wiring lines 127C. Among these, a second overlapping connection wiring line 33 that partially overlaps the first driver 121A and the second driver 121B and a second non-overlapping connection wiring line 34 not overlapping the first driver 121A and the second driver 121B are included as members of these third connection wiring lines 127C. The second non-overlapping connection wiring line 34 has the entirety thereof pass through the area between an external communication terminal 122 and the input terminals 123 in the Y axis direction on the non-display area NAA, in a manner similar to the non-overlapping connection wiring line 132 that connects to the second input terminal 123B of the second driver 121B.

Meanwhile, the second overlapping connection wiring line 33 has the middle portion thereof from the third input terminal 123C to the external connection terminal 122 pass through the mounting area of the second driver 121B, in addition to the mounting area of the first driver 121A. Specifically, the second overlapping connection wiring line 33 has a similar route to the overlapping connection wiring line 131 and extends from the mounting area of the first driver 121A to the mounting area of the second driver 121B, passes between the second input terminal 123B and the second output terminal 124B twice, leaves the mounting area of the second driver 121B, passes between the third input terminal 123C and the third output terminal 124C, and then connects to the third output terminal 124C shown on the left end in FIG. 11. Accordingly, the second overlapping connection wiring line 33 does not overlap, in the Y axis direction, either the non-overlapping connection wiring line 132 or the second non-overlapping connection wiring line 34 in the area between the external connection terminal 122 and the input terminals 123 in the Y axis direction on the non-display area NAA. This makes it possible to freely configure the wiring line route and line width of the second non-overlapping connection wiring line 34 and the second overlapping connection wiring line 33, thereby allowing for the line width of the third connection wiring lines 127C constituted of the second non-overlapping connection wiring line 34 and the second overlapping connection wiring line 33 to be made larger than the second connection wiring lines 127B. In other words, the line width of the respective connection wiring lines 127A to 127C can be made so as to be progressively wider in proportion to the distance (wiring line length) from the flexible substrate 113 to the respective drivers 121A to 121C. As described above, it is possible to equalize the wiring resistance and to increase the degree of freedom of arrangement of the flexible substrate 113 while keeping the non-display area NAA small.

As described above, the current embodiment includes: the third driver 121C that is one of the plurality of drivers 121 and that is farther from the flexible substrate 113 than the second driver 121B; the second non-overlapping connection wiring line 34 that is one of the plurality of connection wiring lines 127 and that connects the third driver 121C to the flexible substrate 113 and is disposed so as not to overlap the first driver 121A and the second driver 121B; and the second overlapping connection wiring line 33 that is one of the plurality of connection wiring lines 127 and that connects the third driver 121C to the flexible substrate 113 and has at least a portion thereof overlapping the first driver 121A and the second driver 121B. With this configuration, the overlapping connection wiring line 131 overlapping the first driver 121A is included as one of the connection wiring lines 127 that connects the second driver 121B to the flexible substrate 113, and the second overlapping connection wiring line 33 overlapping the first driver 121A and the second driver 121B is included as one of the connection wiring lines 127 that connects the third driver 121C to the flexible substrate 113; therefore, it is possible to secure a favorable amount of arrangement space for the non-overlapping connection wiring line 132 that connects the second driver 121B to the flexible substrate 113 and for the second non-overlapping connection wiring line 34 that connects the third driver 121C to the flexible substrate 113. This makes it possible to equalize the wiring resistance of the connection wiring lines 127 connecting the first driver 121A to the flexible substrate 113, the connection wiring lines 127 connecting the second driver 121B to the flexible substrate 113, and the connection wiring lines 127 connecting the third driver 121C to the flexible substrate 131 while keeping the non-display area NAA small.

<Embodiment 3>

Embodiment 3 of the present invention will be described with reference to FIG. 12. In Embodiment 3, a wiring route of an overlapping connection wiring line 231 has been modified. Descriptions of structures, operations, and effects similar to those of Embodiment 1 will be omitted.

Figure 12:
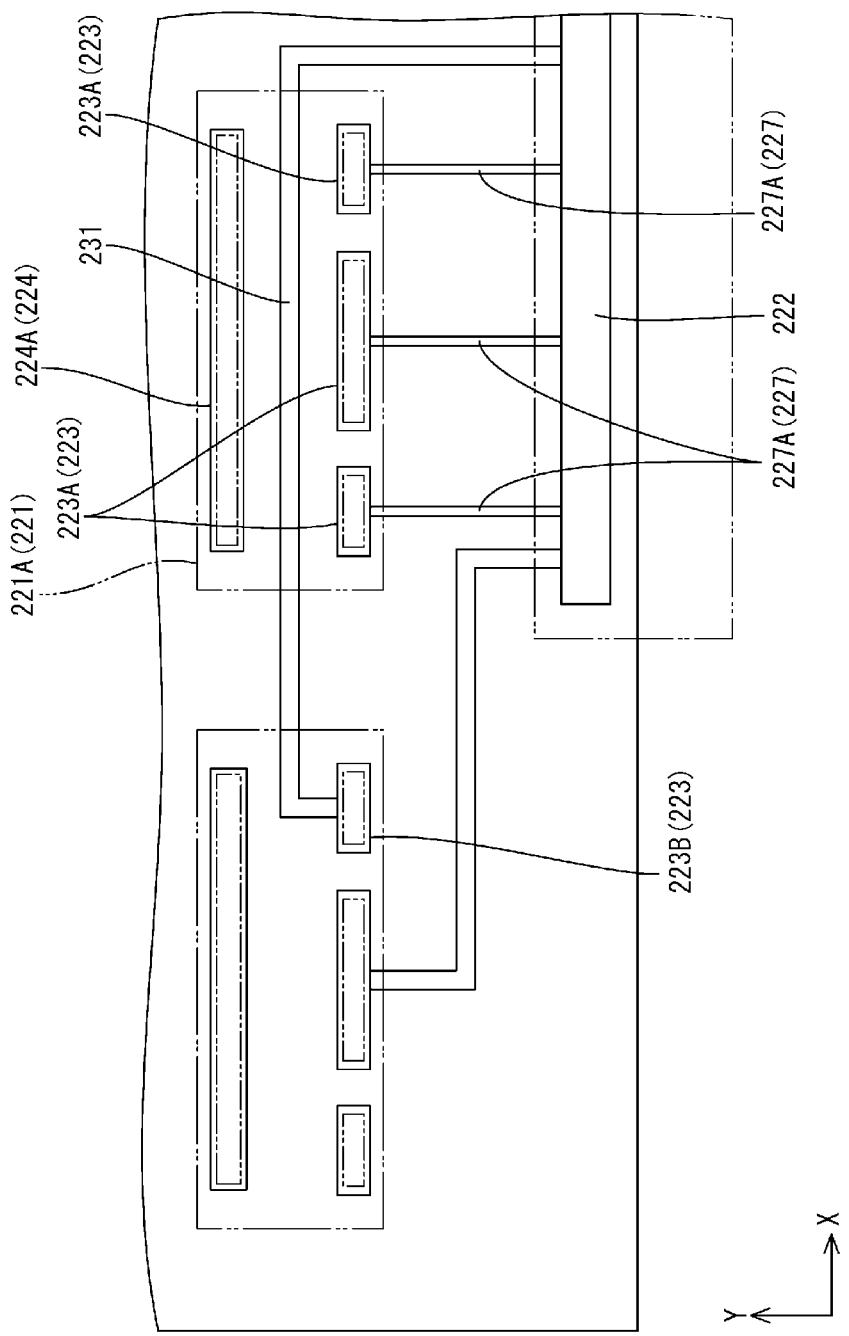
FIG. 12 is a close-up plan view of a mounting region of drivers and a flexible substrate on an array substrate according to Embodiment 3 of the present invention.

As shown in FIG. 12, the overlapping connection wiring line 231 according to the present embodiment passes between first input terminals 223A and a first output terminal 224A twice on the mounting area of a first driver 221A. Specifically, the overlapping connection wiring line 231 extends from the location on an external connection terminal 222 to the right of all of the first connection wiring lines 227A in FIG. 12 towards the top in the drawing along the Y axis direction, and then bends towards the left side in the drawing after passing the first input terminals 223A. Thereafter, the overlapping connection wiring line 231 extends towards the left side in FIG. 12, passes between the first input terminal 223A on the right edge in the drawing and the first output terminal 224A, enters the mounting area of the first driver 221A, and then goes across the mounting area in the X axis direction. The overlapping connection wiring line 231 then passes between the first input terminal 223A on the right edge in FIG. 12 and the first output terminal 224A and leaves the mounting area of the first driver 221A, thereafter connecting to the second input terminal 223B. In the present embodiment, all of the first input terminals 223A are connected to the external connection terminal 222 through the first connection wiring lines 227A, and this narrows the gap between the adjacent first input terminals 223A. Thus, even if the gaps between the respective first input terminals 223A are narrow, the overlapping connection wiring line 231 has the above-mentioned route, which makes it possible to secure sufficient space for the line width thereof and to equalize the wiring resistance.

As described above, according to the present embodiment, the overlapping connection wiring line 231 passes between the first input terminals 223A and the first output terminal 224A twice to connect to the second driver 221B. This configuration is suitable for when it is difficult to secure space for passing the overlapping connection wiring line 231 between the plurality of first input terminals 223A.

<Embodiment 4>

Embodiment 4 of the present invention will be described with reference to FIG. 13. In Embodiment 4, wiring routes of overlapping connection wiring lines 331 have been changed. Descriptions of structures, operations, and effects similar to those of Embodiment 1 will be omitted.

Figure 13:
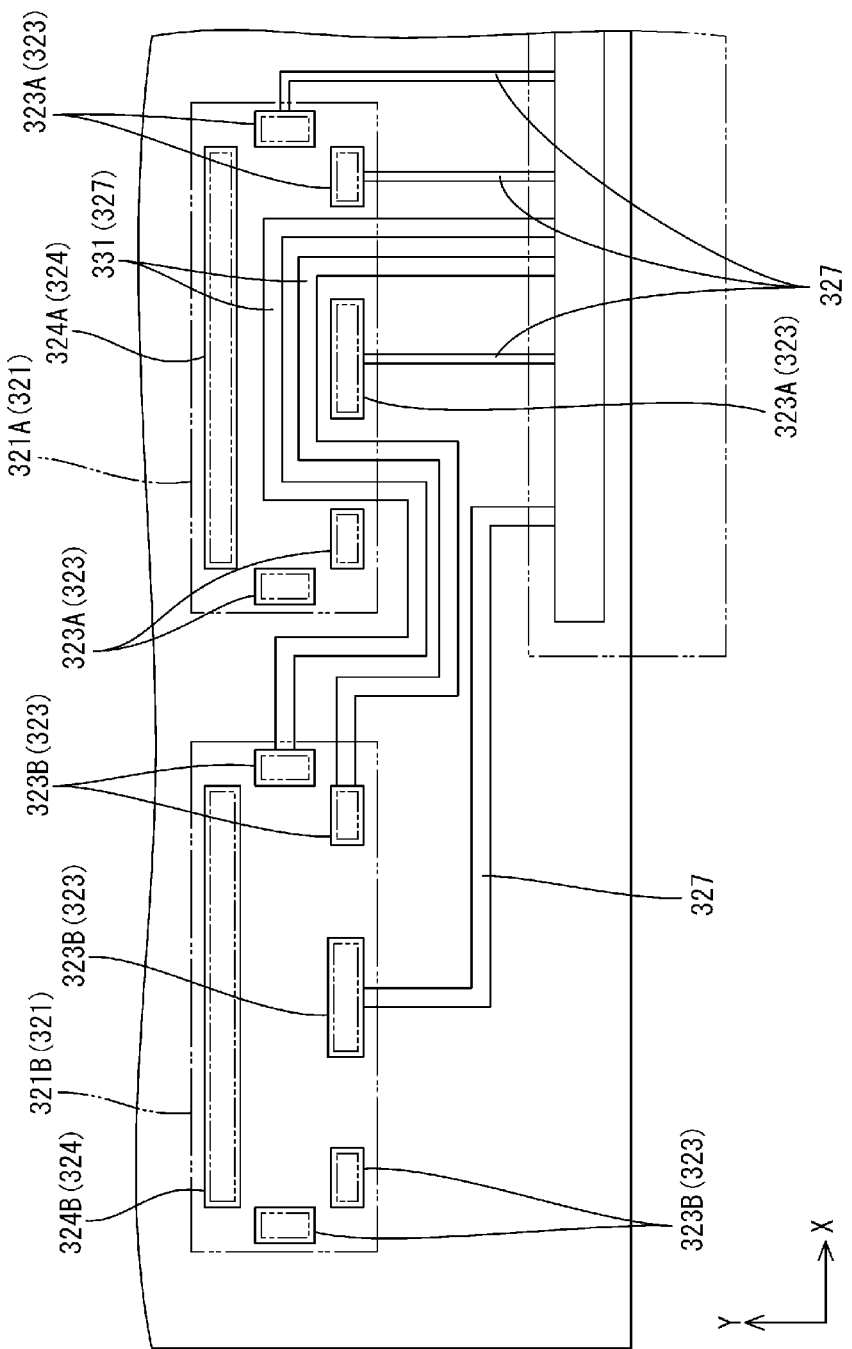
FIG. 13 is a close-up plan view of a mounting region of drivers and a flexible substrate on an array substrate according to Embodiment 4 of the present invention.

As shown in FIG. 13, the overlapping connection wiring lines 331 according to the present embodiment pass between first input terminals 323A twice on the mounting area of a first driver 321A. Input terminals 323 will be described before the overlapping connection wiring lines 331. Three of the input terminals 323 according to the present embodiment are aligned along the X axis direction on the mounting area of the drivers 321, and a pair of the input terminals 323 are also provided between the three input terminals 323 and the output terminal 324 on both ends in the X axis direction on the drivers 321. Therefore, a total of five of the input terminals 323 are arranged along the periphery of the mounting area on each of the drivers 321. There are three of the connection wiring lines 327 for connecting the center input terminal 323 and the two input terminals 323 on the right in FIG. 13 on the mounting area of the driver 321 to the external connection terminal 322.

There are two of the overlapping connection wiring lines 331 according to the present embodiment for connecting to the two second input terminals 323B on the right in FIG. 13. In a manner similar to the overlapping connection wiring lines 31 described in Embodiment 1 (see FIG. 6), the respective overlapping connection wiring lines 331 pass between the first input terminal 323A in the center and the first input terminals 323A to the right thereof and enter the mounting area of the first driver 321A. The respective overlapping connection lines 331 then bend in a cuff shape and pass between the first input terminal 323A in the center and the first input terminals 323A to the left thereof, thereafter leaving the mounting area of the first driver 321A. After this, the respective overlapping connection wiring lines 331 go around the outside of the mounting area of the first driver 321A, bend in a cuff shape again, and then connect to the respective second input terminals 323B. In this manner, it is sometimes difficult to secure sufficient gaps between the first input terminals 323A and the first output terminal 324A in a configuration in which the input terminals 323 are aligned around the periphery of the mounting area of the drivers 321. Even in this case, it is possible to secure a sufficient line width and to equalize wiring resistance by using a wiring route such as the one described above for the overlapping connection wiring lines 331.

As described above, according to the present embodiment, the overlapping connection wiring lines 331 passes between the plurality of first input terminals 323A twice to connect to the respective second drivers 321B. This configuration is suitable for when it is difficult to secure space for passing the overlapping connection wiring lines 331 between the first input terminals 323A and the first output terminal 324A.

<Embodiment 5>

Embodiment 5 of the present invention will be described with reference to FIGS. 14 and 15. In Embodiment 5, dummy terminals 35 are provided at the middle of overlapping connection wiring lines 431. Descriptions of structures, operations, and effects similar to those of Embodiment 1 will be omitted.

Figure 14:
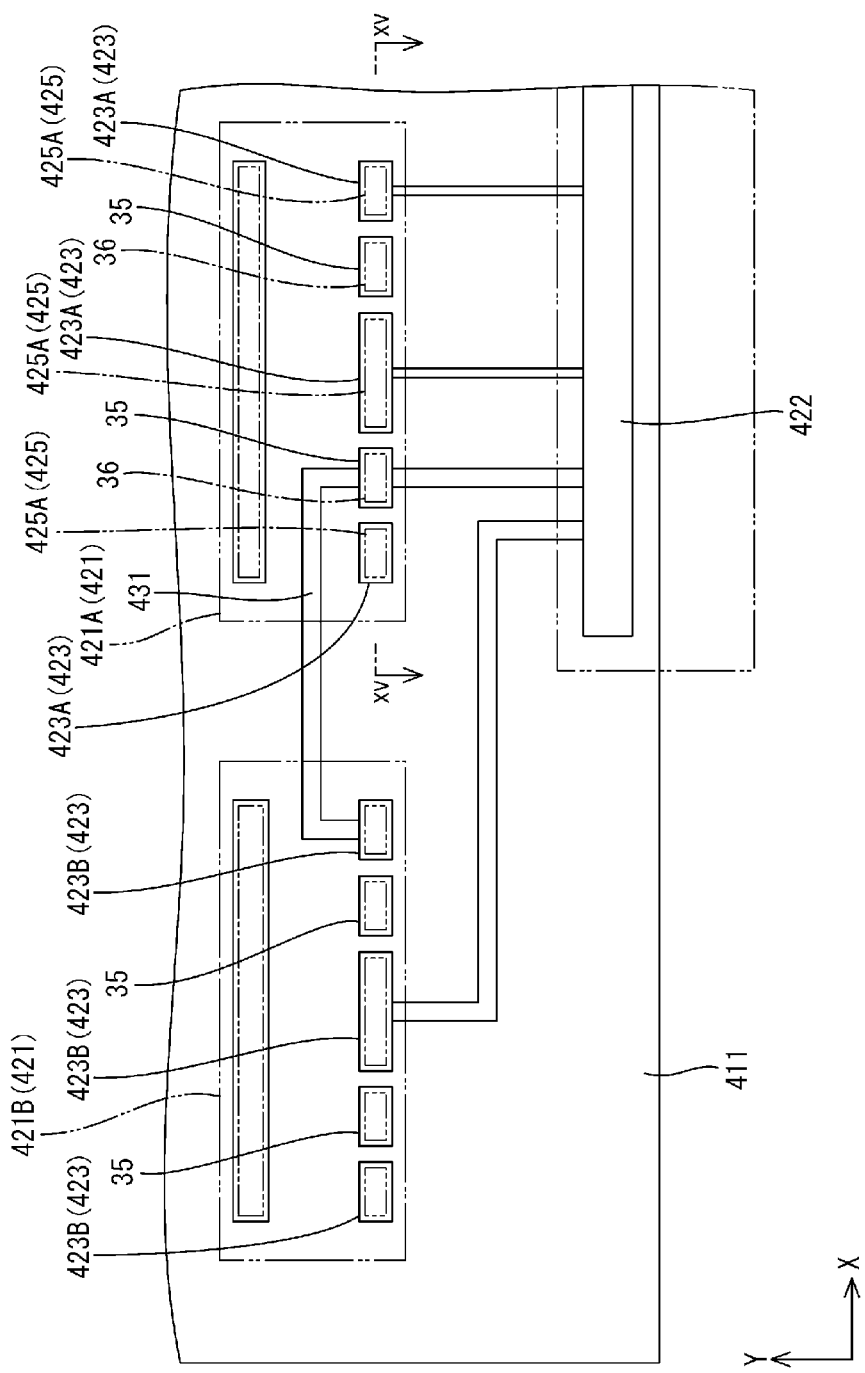
FIG. 14 is a close-up plan view of a mounting region of drivers and a flexible substrate on an array substrate according to Embodiment 5 of the present invention.
Figure 15:
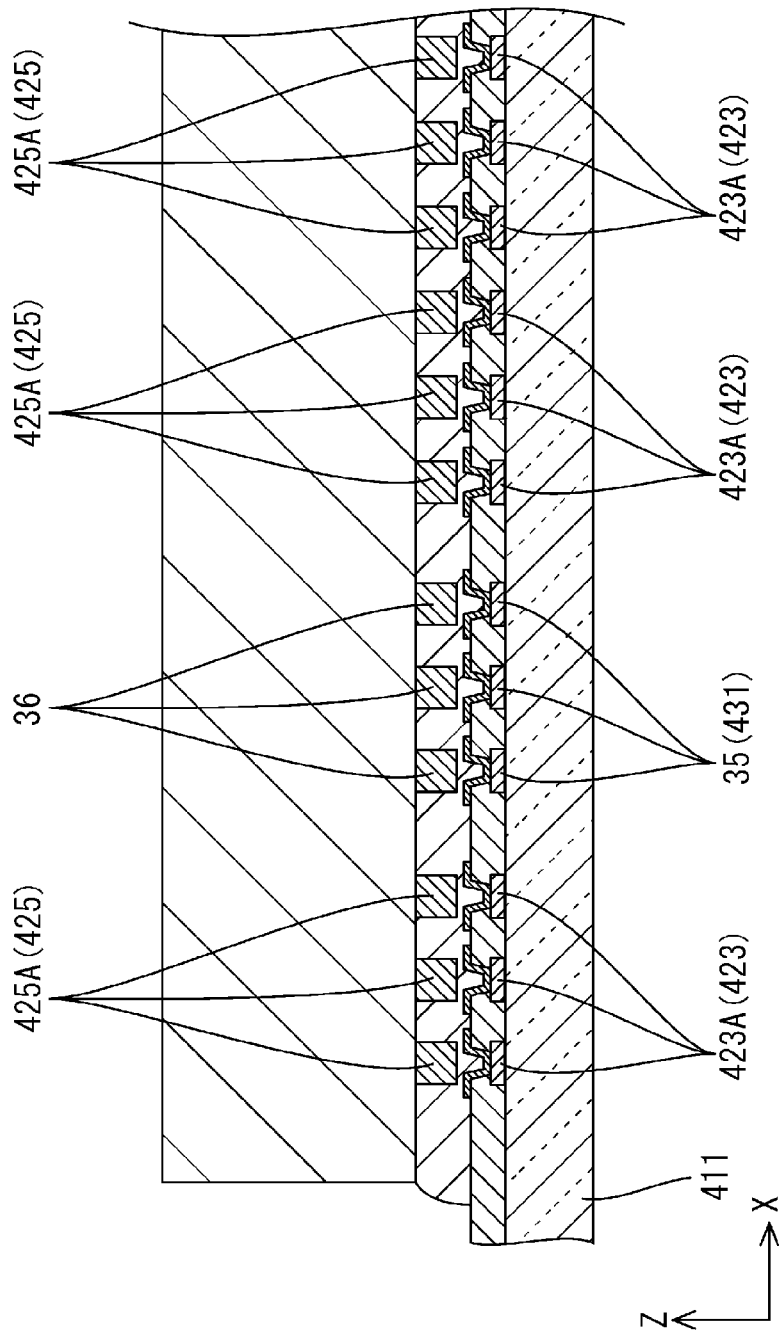
FIG. 15 is a cross-sectional view of FIG. 14 along the line xv-xv.

Of the overlapping connection wiring lines 431 according to the present embodiment, the dummy terminals 35 are disposed at the portions overlapping with a first driver 421A, as shown in FIGS. 14 and 15. The dummy terminals 35 are positioned in pairs between the adjacent input terminals 423. One of the dummy terminals 35 disposed in the mounting area on the first driver 421A is connected to the overlapping connection wiring line 431. Accordingly, this dummy terminal 35 is connected to a second input terminal 423B and an external connection terminal 422 by the overlapping connection wiring line 431. The dummy terminals 35 have a similar cross-sectional configuration to the input terminals 423. Driver dummy terminals (circuit dummy terminals) that connect to the dummy terminals 35 are provided on the drivers 421. A pair of the driver dummy terminals 36 are located between the driver input terminals 425 that are adjacent to each other. The driver dummy terminals 36 are not connected to a processing circuit section 30 of the drivers 421 (see FIG. 9), unlike the driver input terminals 425. Accordingly, even if the dummy terminal 35 connected to the overlapping connection wiring line 431 is connected to the driver dummy terminal 36, the input signals transmitted to the overlapping connection wiring line 431 can be prevented from being processed in the processing circuit section 30 of the first driver 421A. As described above, the dummy terminals 35 arranged between the adjacent input terminals 423 connect to the driver dummy terminals 36, thereby making it possible to further stabilize the connection state of the input terminals 423 to the driver input terminals 425.

As described above, according to the present embodiment, the input terminals 423 are disposed on a non-display area NAA of a liquid crystal panel 411, whereas driver input terminals (circuit input terminals) 425 that connect to the input terminals 423, and the processing circuit section 30 that processes input signals from the driver input terminals 425 are disposed on the first driver 421A. The dummy terminal 35 that connects to the portion of the overlapping connection wiring line 431 that overlaps the first driver 421A is disposed on the non-display area NAA of the liquid crystal panel 411, whereas the dummy terminal 35 connects to the first driver 421A. The driver dummy terminal (circuit dummy terminal) 36, however, does not connect to the circuit processing section 30. With this configuration, the input terminals 423 on the liquid crystal panel 411 side connect to the driver input terminals 425 on the first driver 421A side, and the dummy terminal 35 that connects to the overlapping connection wiring line 341 on the liquid crystal panel 411 side connects to the driver dummy terminal 36 on the first driver 421A side, thereby making it possible to stabilize the connection state of the input terminals 423 and the driver input terminals 425. The overlapping connection wiring line 431 connects to the driver dummy terminal 36, but does not connect to the processing circuit section 30; therefore, it is possible to prevent input signals supplied to the overlapping connection wiring line 431 from being accidentally processed at the first driver 421A.

<Embodiment 6>

Embodiment 6 of the present invention will be described with reference to FIGS. 16 and 17. In Embodiment 6, the arrangement of input terminals 523 has been modified, and the input terminals 523 that overlap respective overlapping connection wiring lines 531 do not connect to these overlapping connection wiring lines 531. Descriptions of structures, operations, and effects similar to those of Embodiment 1 will be omitted.

Figure 16:
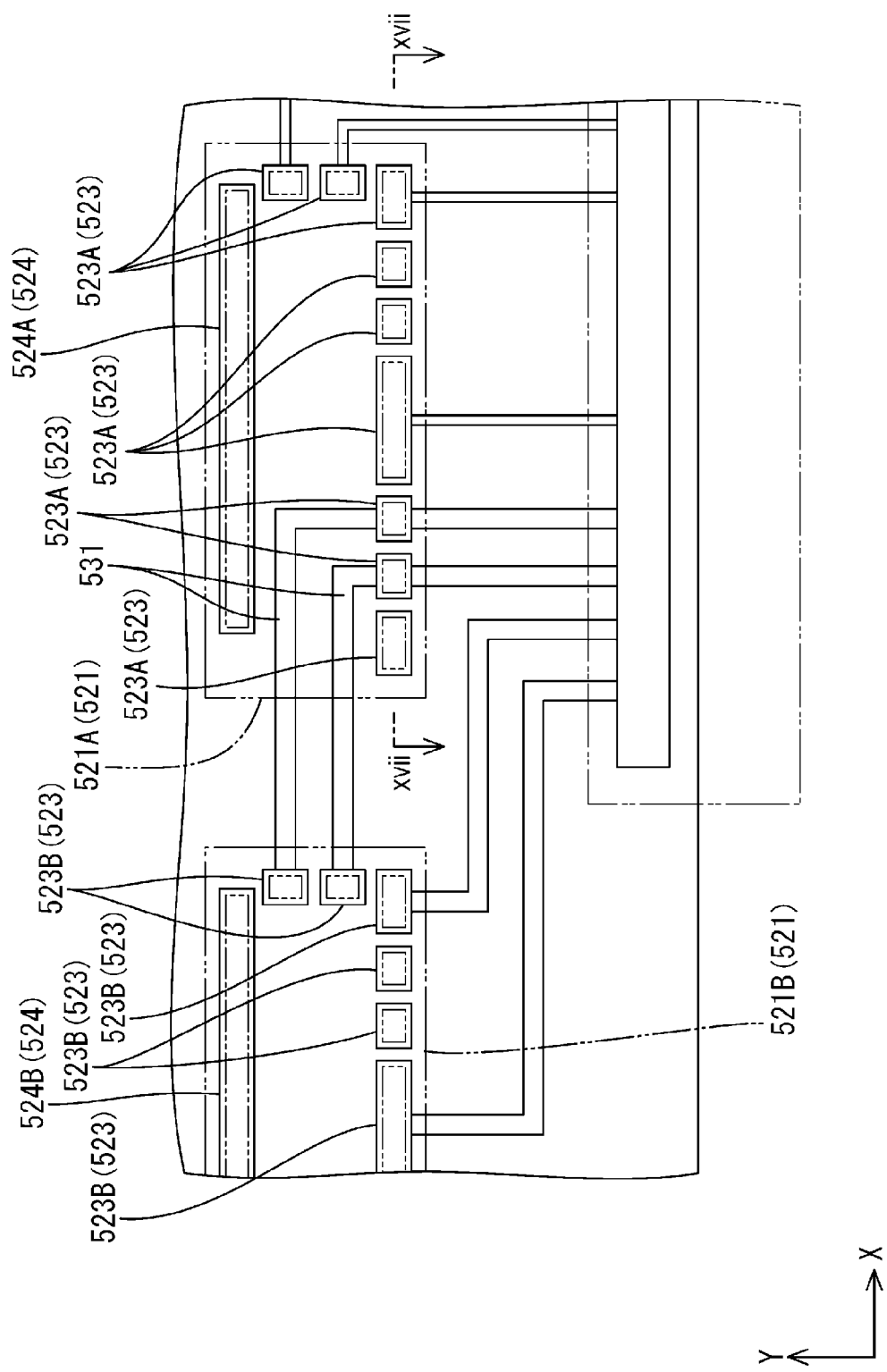
FIG. 16 is a close-up plan view of a mounting region of drivers and a flexible substrate on an array substrate according to Embodiment 6 of the present invention.

As shown in FIG. 16, two each of the input terminals 523 according to the present embodiment are added between the input terminal 523 in the center and the respective input terminals 523 on both ends, and two each are added between the input terminal 523 on the right edge in the drawing and the output terminal 524, for a total of nine input terminals 523. Of second input terminals 523B arranged on the mounting area of a second driver 521B, two of the overlapping connection wiring lines 531 respectively connect to two of the input terminals 523B arranged between the second input terminal 523B on the right edge in FIG. 16 and a second output terminal 524B, whereas two non-overlapping connection wiring lines 532 are respectively connected to the second input terminal 523 in the center and the second input terminal 523B on the right edge. On the mounting area of the first driver 521A, two first input drivers 523A arranged between the first input driver 523A in the center and the first input driver 523A on the left edge in FIG. 16 are arranged so as to respectively overlap with the two overlapping connection wiring lines 531 in a plan view.

Figure 17:
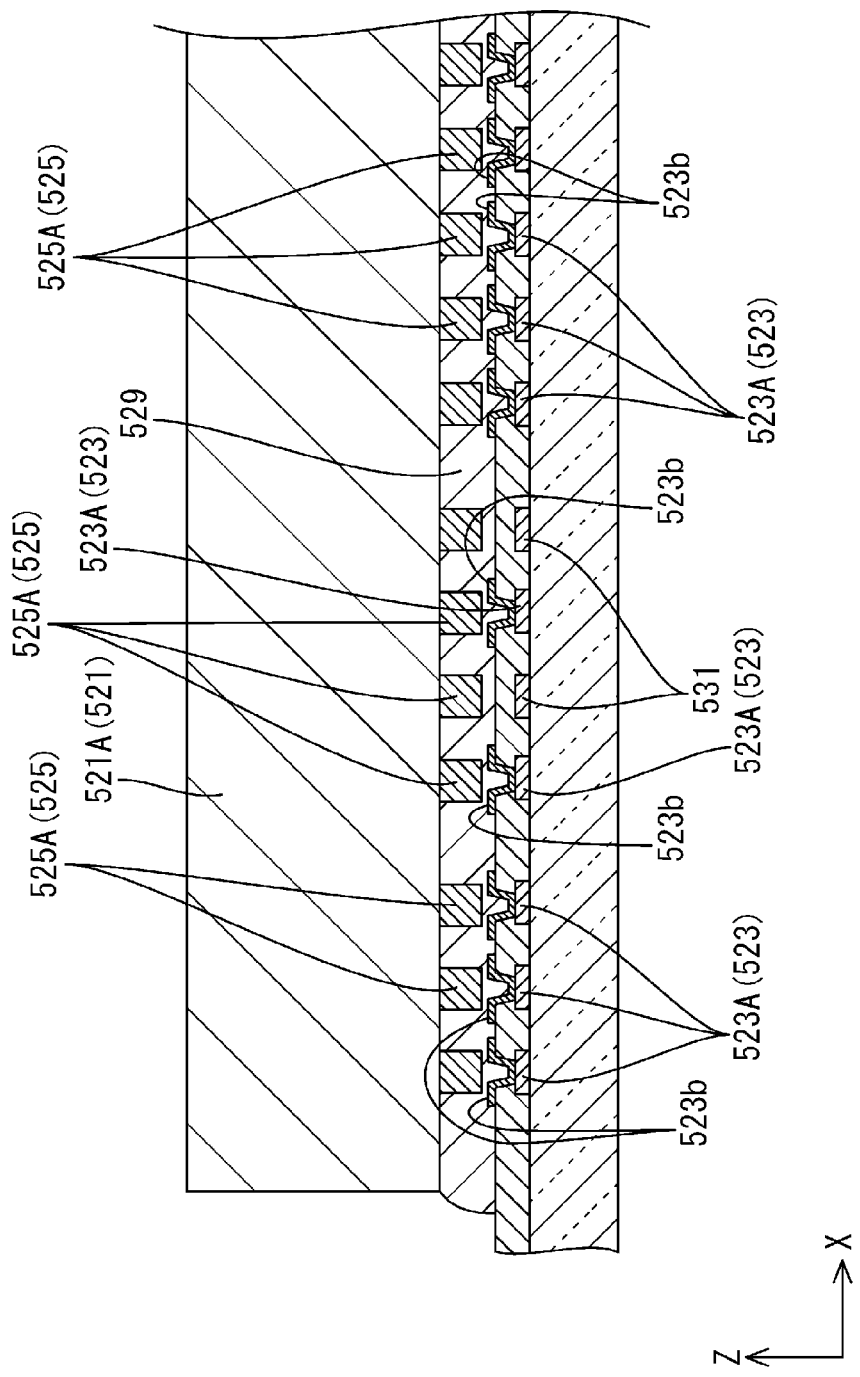
FIG. 17 is a cross-sectional view of FIG. 16 along the line xvii-xvii.

Specifically, as shown in FIG. 17, the single input terminals (pad 523b and contact hole) included as part of the first input terminals 523A overlapping the overlapping connection wiring lines 531 are disposed only in a location that does not overlap the overlapping connection wiring lines 531, and are not disposed in a location overlapping the overlapping connection wiring lines 531. This causes an insulating layer 529 interposed between the overlapping connection wiring lines 531 and the driver input terminals 525A of the first driver 521A to keep these insulated from each other. This prevents the input signals to be transmitted to the overlapping connection wiring lines 531 from being inputted to the first driver 521A.

<Embodiment 7>

Embodiment 7 of the present invention will be described with reference to FIG. 18. In Embodiment 7, non-overlapping connection wiring lines 632 have been added. Descriptions of structures, operations, and effects similar to those of Embodiment 1 will be omitted.

Figure 18:
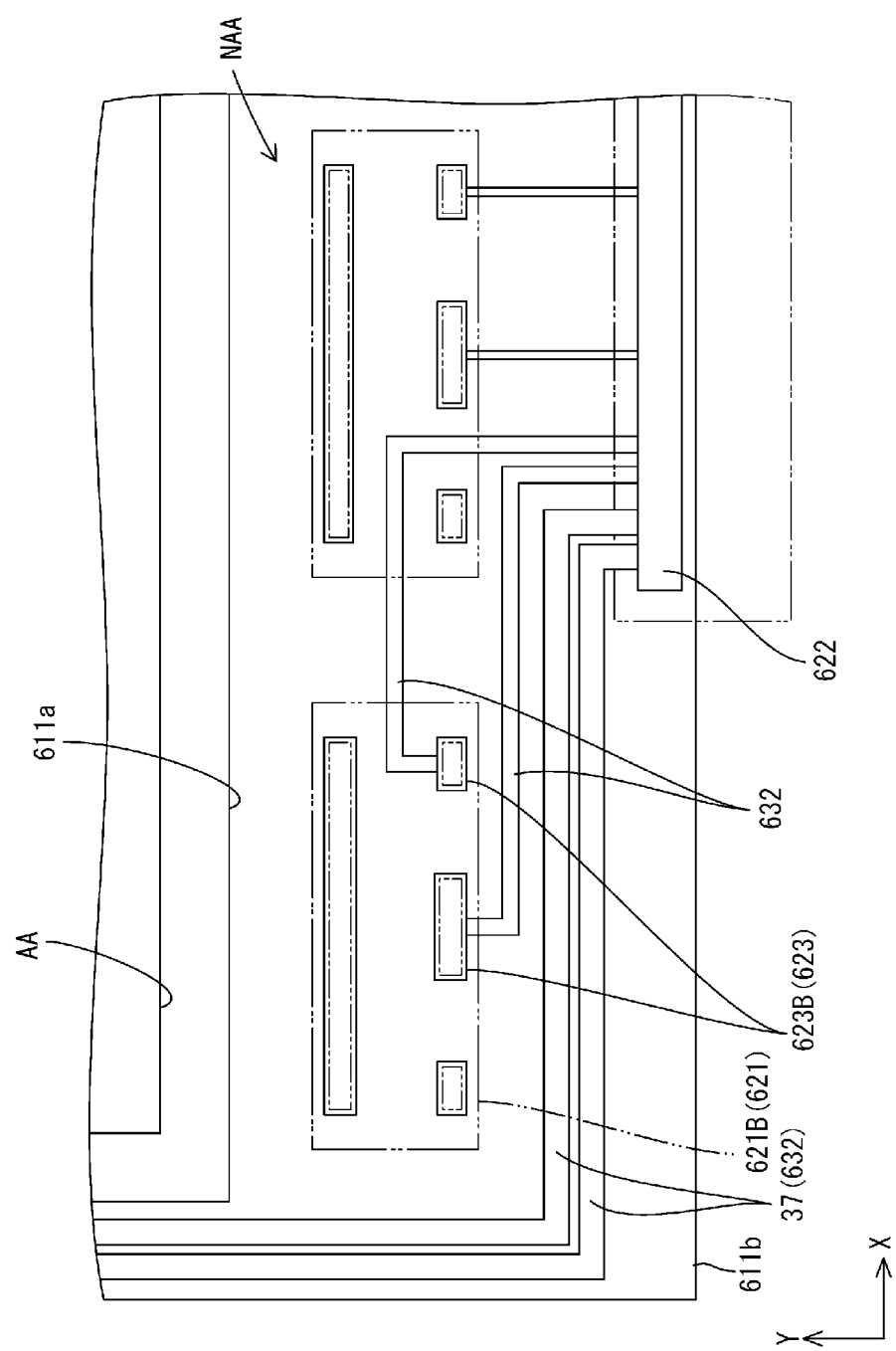
FIG. 18 is a close-up plan view of a mounting region of drivers and a flexible substrate on an array substrate according to Embodiment 7 of the present invention.

As shown in FIG. 18, the non-overlapping connection wiring line connecting a second input terminal 623B in the center of the mounting area on a second driver 621B to an external connection terminal 622, and the non-overlapping connection wiring line that directly or indirectly connects to the wiring lines in a display area AA to connect these wiring lines to the external connection terminal 622, are included as members of the non-overlapping connection wiring lines 632 according to the present embodiment. Hereinafter, these will be referred to as display non-overlapping connection wiring lines 37. Specifically, among the wiring lines in the display area AA, the display non-overlapping connection wiring lines 37 are directly connected to opposite electrode wiring lines (not shown) that are connected to an opposite electrode 11j (see FIG. 3) on a CF substrate 611a. A gate driver section (not shown) formed in a portion of a non-display area NAA adjacent in the X axis direction to the display area AA is connected to gate wiring lines 19 (see FIG. 4) of an array substrate 611b in the display area AA, and the display non-overlapping connection wiring lines 37 are also directly connected to this gate driver section. In other words, it can be said that the display non-overlapping connection wiring lines 37 are indirectly connected to the gate wiring lines 19 in the display area AA via the gate driver section. The gate driver section is formed using the process to form the other structures on the array substrate 611*b* (such as TFTs 17 shown in FIGS. 3 and 4, the gate wiring lines 19, source wiring lines 20, and the like) and can supply signals to the gate wiring lines 19 to drive the TFTs 17. The display non-overlapping connection wiring lines 37 connecting to these opposite electrode wiring lines and the gate driver section are longer than the non-overlapping connection wiring lines 632 that connect to the second input terminals 623B, and thus, the wiring line width of the display non-overlapping connection wiring lines is greater than the non-overlapping connection wiring lines 632.

<Embodiment 8>

Embodiment 8 of the present invention will be described with reference to FIG. 19. In Embodiment 8, connection wiring lines 727 are respectively connected to all input terminals 723. Descriptions of structures, operations, and effects similar to those of Embodiment 1 will be omitted.

Figure 19:
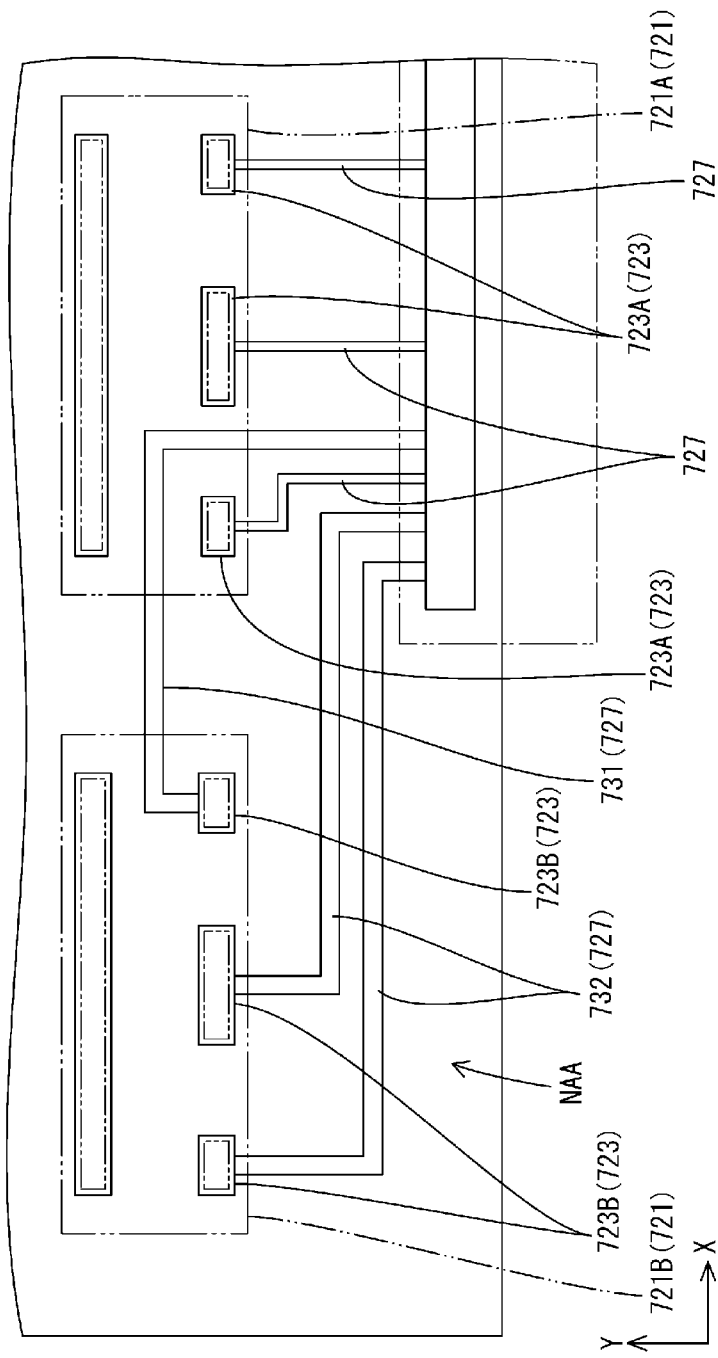
FIG. 19 is a close-up plan view of a mounting region of drivers and a flexible substrate on an array substrate according to Embodiment 8 of the present invention.

As shown in FIG. 19, the input terminals 723 formed on the mounting area of respective drivers 721 in the present embodiment are all respectively connected to the connection wiring lines 727. Even with this type of configuration, an overlapping connection wiring line 731 is included as one of the connection wiring lines 727, thereby making it possible to secure a favorable amount of line width of non-overlapping connection wiring lines 732 while keeping a non-display area NAA small.

<Other Embodiments>

The present invention is not limited to the embodiments shown in the drawings and described above, and the following embodiments are also included in the technical scope of the present invention, for example.

(1) In the respective embodiments above, an example was shown in which the flexible substrate and the second driver do not overlap each other at all in the X axis direction (the arrangement direction of the drivers), but the present invention is also applicable to configurations in which the flexible substrate and the second driver partially overlap in the X axis direction.

(2) In addition to the respective embodiments above, modifications can be made as appropriate to the specific wiring route (number of bends, position of bend or bends), number, line width, shape, and the like of the overlapping connection wiring lines and non-overlapping connection wiring lines. It is also possible to modify, as appropriate, the degree of overlap (the proportion of overlap area to total wiring line area) of the overlapping connection wiring lines with respect to the first driver (and/or section driver).

(3) In addition to the respective embodiments above, it is possible to appropriately modify the specific number, placement on the non-display area, size, shape, and the like of the respective terminals. It is also possible to modify, as appropriate, the specific wiring routes, number, line width, shape, and the like of the connection wiring lines excluding the overlapping connection wiring lines and the non-overlapping connection wiring lines.

(4) In addition to the respective embodiments above, it is possible to appropriately modify the specific number, placement on the non-display area, size, shape, and the like of the drivers. It is possible to have three or more drivers being overlapped by the overlapping connection wiring lines, depending on the number of drivers.

(5) In addition to the respective embodiments above, it is possible to appropriately modify the attachment location (arrangement), size, shape, attachment number, and the like of the flexible substrate on the array substrate.

(6) In the respective embodiments above, an example was shown in which the flexible substrate connects to the long end of the array substrate and the drivers are arranged in a row along the long side direction of this array substrate, but the present invention is also applicable to a configuration in which the flexible substrate connects to the short end of the array substrate and the drivers are arranged in a row along the short side direction of the array substrate.

(7) In the respective embodiments above, an example was shown in which an insulating layer is layered on the driver side overlapping the overlapping connection wiring lines, but the present invention is also applicable to a configuration in which this insulating layer is removed.

(8) In the respective embodiments above, an example was shown in which the line width of the first connection wiring lines was configured to be different from the line width of the second connection wiring lines, but it is also possible to make the line width of first connection wiring lines substantially equal to the line width of the second connection wiring lines. In a similar manner, this method is also applicable to Embodiment 2, which has the third connection wiring lines.

(9) In the respective embodiments above, an example was shown in which the line width of the first connection wiring lines was configured to be different from the line width of the second connection wiring lines, but the wiring resistance of the first connection wiring lines and the second connection wiring lines may be equalized by configuring the thickness of the wiring lines and material thereof to be different. This makes it possible to make the line width of the first connection wiring lines substantially equal to the line width of the second connection wiring lines. In a similar manner, these methods are also applicable to Embodiment 2, which has the third connection wiring lines.

(10) In the respective embodiments above, an example was shown in which the input terminals and output terminals are arranged directly below the main body of the drivers, but it is also possible for the input terminals and output terminals to be arranged directly below lead terminals in a configuration in which the lead terminals protrude laterally from the main body of the drivers, for example, and for the input terminals and output terminals to be arranged in the lateral positions with respect to the main body.

(11) Configurations in which a functional panel such as a touch panel or a parallax barrier panel (switch liquid crystal panel) has been stacked on the liquid crystal panel in the respective embodiments above is also included in the present invention.

(12) In the respective embodiments above, an example was shown in which an edge-lit backlight device was the backlight device of the liquid crystal display device, but configurations that use a direct-lit backlight device are also included in the present invention.

(13) In the respective embodiments above, an example was shown using a transmissive liquid crystal display device having a backlight device, which is an external light source, but the present invention can also be applied to a reflective liquid crystal display device performing display using external light, and in such a case, no backlight device is needed.

(14) In the respective embodiments above, an example was shown in which a liquid crystal panel having a rectangular glass substrate and display section is used, but a liquid crystal panel with an equilateral substrate and display section is also included in the present invention.

(15) In the respective embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(16) In the respective embodiments above, a liquid crystal display device using a liquid crystal panel as a display panel was described as an example, but the present invention can be applied to a display device that uses another type of display panel (such as a PDP or organic EL panel). In such a case, a backlight device can be omitted.

| Description of Reference Characters | |
| --- | --- |
| 10 | liquid crystal display device (display device) |
| 11, 111, 411 | liquid crystal panel (display panel) |
| 12 | control circuit substrate (external signal supply source) |
| 13, 113 | flexible substrate (external connection member) |
| 14 | backlight device (illumination device) |
| 21, 121, 221, 321, 421, 521, 621, 721 | driver (circuit driver section) |
| 21A, 121A, 221A, 321A, 421A, 521A, 721A | first driver (first driver circuit section) |
| 21B, 121B, 321B, 421B, 521B, 621B, 721B | second driver (second driver circuit section) |
| 23, 123, 223, 323, 423, 523, 623, 723 | input terminal |
| 23A, 223A, 323A, 423A, 523A, 723A | first input terminal |
| 23B, 123B, 223B, 323B, 423B, 523B, 623B, 723B | second input terminal |
| 24, 124, 224, 324, 524 | output terminal |
| 24A, 224A, 324A, 524A | first output terminal |
| 24B, 124B, 324B, 524B | second output terminal |
| 27, 127, 227, 327, 727 | connection wiring line |
| 27A, 227A | first connection wiring line |
| 27B, 127B | second connection wiring line |
| 28 | insulating layer |
| 30 | circuit processing section |
| 31, 131, 231, 431, 531, 731 | overlapping connection wiring line |
| 32, 132, 632, 732 | non-overlapping connection wiring line |
| 33 | second overlapping connection wiring line |
| 34 | second non-overlapping connection wiring line |
| 35 | dummy terminal |
| 36 | circuit dummy terminal |
| 121C | third driver (third driver circuit section) |
| AA | display area |
| NAA | non-display area |

What is claimed is:

1. A display device, comprising:
a display panel having a display area that can display an image and a non-display area outside of this display area;
an external connection member attached to the non-display area of the display panel for connecting to an external signal supply source;
a plurality of connection wiring lines disposed in the non-display area of the display panel; and
a plurality of driver circuit sections attached to the non-display area of the display panel and connected to the external connection member by the connection wiring lines, said driver circuit sections receiving input signals from the external signal supply source via said external connection member and transmitting an output signal to the display panel, thereby driving said display panel;
wherein the plurality of driver circuit sections include a first driver circuit section and a second driver circuit section that is disposed further towards a side of the non-display area opposite to the external connection member than the first driver circuit section, and
wherein the plurality of connection wiring lines include a non-overlapping connection wiring line and an overlapping connection wiring line, said non-overlapping connection wiring line connecting the second driver circuit section to the external connection member and being disposed so as not to overlap the first driver circuit section, and said overlapping connection wiring line connecting the second driver circuit section to the external connection member and having at least a portion thereof overlapping the first driver circuit section.

2. The display device according to claim 1,
wherein the plurality of connection wiring lines further comprise:
first connection wiring lines that connect the first driver circuit section to the external connection member; and
second connection wiring lines that connect the second driver circuit section to the external connection member,
wherein said second connection wiring lines include the overlapping connection wiring line and the non-overlapping connection wiring line, and
wherein the second connection wiring lines have a greater line width than the first connection wiring lines.

3. The display device according to claim 1,
wherein the external connection member connects to an edge of the display panel, and
wherein the plurality of driver circuit sections are arranged in a row with gaps therebetween along said edge of the display panel closer to the display area than said external connection member.

4. The display device according to claim 3,
wherein the first driver circuit section is provided at a position that overlaps a position of the external connection member in a direction along the edge of the display panel, and
wherein the second driver circuit section is provided at a position that does not overlap the position of the external connection member in the direction along the edge of the display panel.

5. The display device according to claim 3,
wherein the first driver circuit section is disposed near a center of the edge of the display panel,
wherein the second driver circuit section is disposed near an end on the edge of the display panel, and
wherein the external connection member is disposed in the center of the edge of the display panel.

6. The display device according to claim 5,
wherein the first driver circuit section is provided in a pair, said pair being arranged in a row near the center on the edge of the display panel, and
wherein the second driver circuit section is provided in a pair, said pair being arranged near respective ends on the edge of the display panel.

7. The display device according to claim 1, further comprising:
an insulating layer formed on the overlapping connection wiring line, said insulating layer being stacked on a side of the first driver circuit section that is being overlapped by the overlapping connection wiring line.

8. The display device according to claim 1,
wherein the plurality of driver circuit sections further comprise a third driver circuit section that is disposed further towards a side of the non-display area opposite to the external connection member than the second driver circuit section,
wherein the plurality of connection wiring lines further comprise a second non-overlapping connection wiring line that connects said third driver circuit section to the external connection member, said second non-overlapping connection wiring line being disposed so as not to overlap the first driver circuit section and the second driver circuit section, and wherein the plurality of connection wiring lines further comprise a second overlapping connection wiring line that connects said third driver circuit section to the external connection member, said second overlapping connection wiring line having at least a portion thereof overlapping the first driver circuit section and the second driver circuit section.

9. The display device according to claim 1, further comprising:

input terminals disposed in the non-display area of the display panel;

circuit input terminals respectively disposed in the first driver circuit section, said circuit input terminals respectively connecting to said input terminals;

dummy terminals disposed in the non-display area of the display panel, said dummy terminals connecting to a portion of the overlapping connection wiring line overlapping the first driver circuit section; and circuit dummy terminals disposed in the first driver circuit section, said circuit dummy terminals not connecting to the circuit processing section.

10. The display device according to claim 1, further comprising:

a plurality of first input terminals disposed in the non-display area of the display panel, said first input terminals connecting to the first driver circuit section; and a plurality of first output terminals disposed closer to the display area than said first input terminals, said first output terminals connecting to the first driver circuit section, wherein the overlapping connection wiring line passes through at least one of between the respective plurality of first input terminals and between the respective first input terminals and the first output terminals to connect to the second driver circuit section.

11. The display device according to claim 10, further comprising:

a plurality of second input terminals disposed in the non-display area of the display panel, said second input terminals connecting to the second driver circuit section; and a plurality of second output terminals disposed closer to the display area than said second input terminals, said second output terminals connecting to the second driver circuit section, wherein the overlapping connection wiring line passes between the respective plurality of first input terminals, between the respective first input terminals and the first output terminals, and between the respective second input terminals and the second output terminals to connect to the respective second input terminals.

12. The display device according to claim 10, wherein the overlapping connection wiring line passes between the respective first input terminals and the output terminals twice to connect to the second driver circuit section.

13. The display device according to claim 10, wherein the overlapping connection wiring line passes between the respective plurality of first input terminals twice to connect to the second driver circuit section.

14. The display device according to claim 1, wherein the display panel is a liquid crystal panel constituted of a liquid crystal layer sealed between a pair of substrates.

15. The display device according to claim 14, further comprising:

an illumination device disposed on a side of the display device opposite to the display side so as to face the liquid crystal panel, said illumination device capable of supplying light to said liquid crystal panel.

* * * * *